(12) United States Patent
Kimchi et al.

(10) Patent No.: US 10,655,249 B1
(45) Date of Patent: May 19, 2020

(54) CONTINUOUS MANUFACTURING SYSTEM FOR FIBER COMPONENTS

(71) Applicant: Amazon Technologies, Inc., Seattle, WA (US)

(72) Inventors: Gur Kimchi, Bellevue, WA (US); Robert Arthur Koch, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 288 days.

(21) Appl. No.: 15/636,375

(22) Filed: Jun. 28, 2017

(51) Int. Cl.
*D03D 15/00* (2006.01)
*B29C 70/16* (2006.01)
*B29C 70/52* (2006.01)

(52) U.S. Cl.
CPC ............ *D03D 15/00* (2013.01); *B29C 70/16* (2013.01); *B29C 70/528* (2013.01)

(58) Field of Classification Search
CPC ........ D03D 15/00; B29C 70/16; B29C 70/528

USPC ........ 156/441, 180, 245, 390, 433, 498, 500
See application file for complete search history.

(56) References Cited

U.S. PATENT DOCUMENTS 5,820,804 A * 10/1998 Elmaleh ................ B29C 33/308
264/167
2009/0211173 A1 * 8/2009 Willey .................. B29C 70/222
52/40

* cited by examiner

*Primary Examiner* — Vishal I Patel
(74) *Attorney, Agent, or Firm* — Athorus, PLLC

(57) ABSTRACT

Continuous manufacturing systems and methods for fiber components are described. The continuous manufacturing systems may include core preparation, fiber weaving, pressure application, fiber curing, cooling, and post-processing subsystems. For example, fiber components having varying shapes, weaving parameters, and/or structural properties may be continuously formed. In addition, various additional fibers having additional functions or characteristics may be continuously woven together in the fiber components. Further, the pressure application, curing, and/or cooling subsystems may utilize various outer dies that are cycled through and between the subsystems.

14 Claims, 11 Drawing Sheets

CONTINUOUS MANUFACTURING SYSTEM FOR FIBER COMPONENTS

BACKGROUND

Existing processes for manufacturing carbon fiber components require the manufacture of discrete portions of such components and subsequent joining of the discrete portions to form completed components. The completed components may be large and/or made up of multiple, non-homogeneous portions. However, the manufacture and joining of multiple discrete portions suffers from inefficiencies, and such completed components may also suffer from physical or structural discontinuities as a result of the manufacturing and joining processes. Accordingly, there is a need for systems and methods for manufacturing fiber components efficiently and without the drawbacks of existing processes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
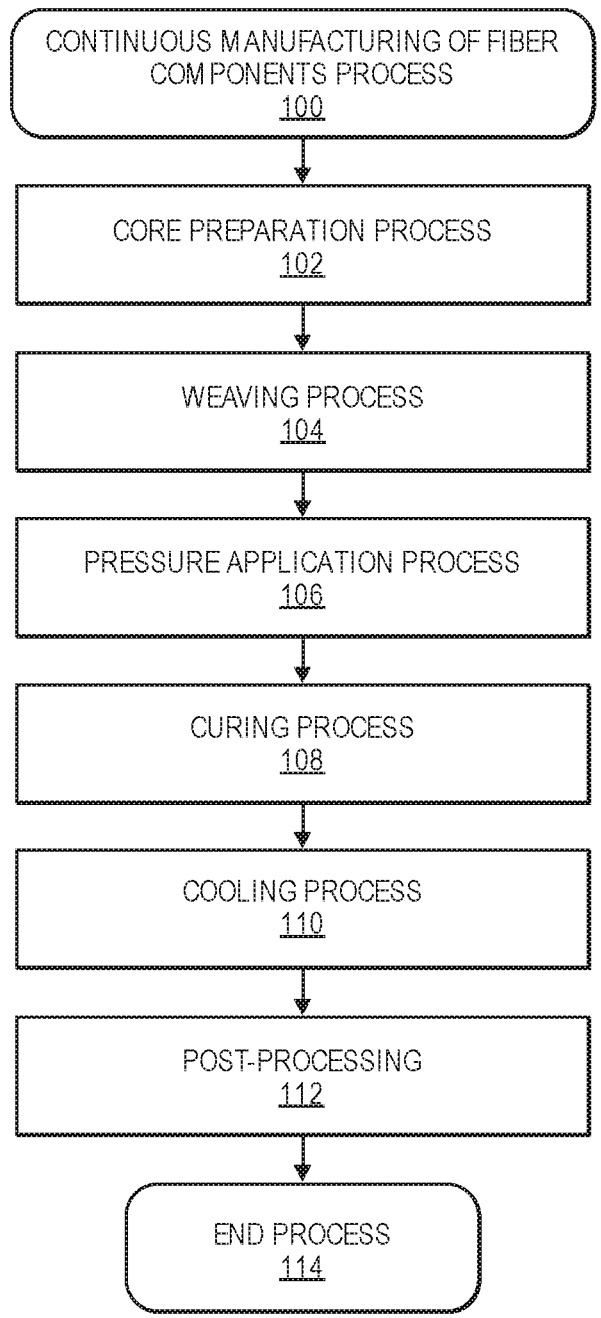
FIG. 1 is a flow diagram illustrating an example continuous manufacturing process for fiber components, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various systems and methods for continuous manufacturing of fiber components are described. Various types of fiber components may be manufactured using the systems and methods described herein. For example, large fiber components such as wings or fuselages of air-based vehicles, hulls of water-based vehicles, frames of ground-based vehicles, building materials, or other types of fiber components may be continuously manufactured using the systems and methods described herein. In addition, fiber components having varied structural characteristics over a plurality of sections of the fiber components may be continuously manufactured using the systems and methods described herein. Further, fiber components having additional fibers or elements embedded therein may also be continuously manufactured using the systems and methods described herein, in which the additional fibers or elements may have various additional functions or characteristics.

The continuous manufacturing systems and methods described herein may include various subsystems or subprocesses. For example, the subsystems or subprocesses may include core preparation subsystems or subprocesses, weaving subsystems or subprocesses, pressure application subsystems or subprocesses, curing subsystems or subprocesses, cooling subsystems or subprocesses, and/or post-processing subsystems or subprocesses.

In some embodiments, the continuous manufacturing system and method may include a fixed inner core having a plurality of sections that are formed to a desired shape. Fibers may then be woven over the sections of the fixed inner core according to desired weaving parameters. Then, one or more outer dies may apply pressure to the fibers woven over the sections of the fixed inner core according to desired pressure application parameters. The one or more outer dies may be fixed or flexible outer dies. While applying pressure, the one or more outer dies may pass through a curing system to cure the fibers woven over the sections of the fixed inner core according to desired curing parameters. Then, the one or more outer dies may remove the pressure applied to the fibers woven over the sections of the fixed inner core, and the cured fibers woven over the sections of the fixed inner core may be cooled according to desired cooling parameters.

The fixed inner core may be formed using various processes. For example, the fixed inner core may be formed by extrusion, cutting, grinding, sanding, polishing, other processes, or combinations thereof. In one example embodiment, hot wire systems may be used for cutting or similar processes. In other example embodiments, 3D printing or other core generation systems may be used to create the fixed inner core. Further, the fixed inner core may be formed of various materials, such as foam, plastic, wood, other materials, or combinations thereof.

In other embodiments, the continuous manufacturing system and method may include a flexible inner core having a plurality of sections. Fibers may be woven over the sections of the flexible inner core according to desired weaving parameters. Then, the flexible inner core and one or more outer dies may apply pressure to the fibers woven over the sections of the flexible inner core according to desired pressure application parameters. The one or more outer dies may be fixed outer dies. While applying pressure, the flexible inner core and the one or more outer dies may pass through a curing system to cure the fibers woven over the sections of the flexible inner core according to desired curing parameters. Then, the flexible inner core and the one or more outer dies may remove the pressure applied to the fibers woven over the sections of the flexible inner core, and the flexible inner core may be withdrawn from the cured fibers and prepared for curing a next section of fibers. Thereafter, the cured fibers woven over the sections of the flexible inner core may be cooled according to desired cooling parameters.

The flexible inner core may include a plurality of sections and may be extendible and retractable along a direction of processing. For example, the flexible inner core may include a first section that extends and retracts to and from weaving subsystems or subprocesses, a second section upon which the fibers may be woven, and a third section that expands to apply pressure to the fibers for curing. Further, the flexible inner core may include additional sections, e.g., a third section that initially applies pressure to the fibers, and fourth and fifth sections that apply pressure to the fibers during curing. In addition, the second section may at least partially expand in order to release the woven fibers from direct contact with the second section. In this manner, the flexible inner core may be selectively extended and retracted within sections of fiber components, such that a plurality of sections of fiber components may be continuously manufactured.

The fibers may be woven over the sections of the fixed or flexible inner core according to desired weaving parameters. The fibers may include various types of fibers, such as carbon fibers, glass fibers, aramid fibers including para-aramid fibers (e.g., Kevlar) or meta-aramid fibers, or any other fibers or tapes that may be woven and cured as described herein. In addition, the fibers may include tubes, pipes, or channels of various geometries having hollow or open internal sections, which may be configured to operate as hydraulic or pneumatic lines, for example. The weaving parameters may include weaving angle, weaving direction, weaving density or spacing, fiber type, fiber size, a number of fiber layers, other parameters, or combinations thereof. In addition, the weaving parameters may be selected to control properties of the woven fibers, such as strength, stiffness, flexibility, weight, other properties, or combinations thereof. Further, additional fibers may be woven over the sections of the fixed or flexible inner core. For example, the additional fibers may include conductors, insulators, wires, antennas, electromagnetic or radiofrequency signal transmitting fibers, electromagnetic or radiofrequency interference blocking fibers, tubes, pipes, channels, other fibers, or combinations thereof.

The one or more outer dies may be selected based on the sections of the inner core and desired pressure application and/or curing parameters. The outer dies may be maintained in storage, brought to the continuous manufacturing system as needed, and then returned to storage after completion of processing. In addition, the outer dies may cycle through the pressure application, curing, and/or cooling subsystems or subprocesses. Further, the outer dies may be fixed or flexible outer dies. In embodiments using flexible outer dies, the flexible outer dies may cycle between the pressure application, curing, and/or cooling subsystems or subprocesses without need for removal from the continuous manufacturing system or placement in storage.

Various types of post-processing may be performed on fiber components that have been continuously manufactured using the systems and methods described herein. For example, the fiber components may undergo various cutting, drilling, grinding, surface finishing, painting, coating, or other processing. In addition, if a fixed inner core was used, the material of the fixed inner core may be dissolved or otherwise removed, e.g., through the use of particular chemicals or solvents, or other removal methods. Further, if additional fibers having different functions or characteristics have been woven into the fiber components, the fiber components may undergo various electrical connection, power connection, communication connection, or other processing associated with the functions or characteristics of the additional fibers.

FIG. 1 is a flow diagram illustrating an example continuous manufacturing process 100 for fiber components, according to an implementation. The continuous manufacturing process 100 may include various subprocesses. For example, the continuous manufacturing process 100 may begin with a core preparation process 102, as described in further detail with respect to FIG. 5. In some embodiments, the core preparation process 102 may include forming a fixed inner core around which a fiber component is to be woven. In other embodiments, the core preparation process 102 may be omitted if, for example, a flexible inner core, or flexible inner die or tool, is to be used around which a fiber component is to be woven.

The fixed inner core may be formed by extrusion, cutting, grinding, sanding, polishing, other processes, or combinations thereof, and may include a plurality of sections. In one example embodiment, hot wire systems may be used for cutting or similar processes. In other example embodiments, 3D printing or other core generation systems may be used to create the plurality of sections of the fixed inner core. In addition, the fixed inner core may be formed of various materials, such as foam, plastic, wood, other materials, or combinations thereof. Further, each of the sections of the fixed inner core may be formed according to any desired shape. For example, the dimensions of the sections of the fixed inner core may be determined such that desired final dimensions of the woven and cured fibers around the sections of the fixed inner core are achieved following completion of processing. The core preparation process 102 may proceed continuously such that the fixed inner core is formed as a single integral piece and processed by further downstream subprocesses of the continuous manufacturing process 100.

Figure 6:
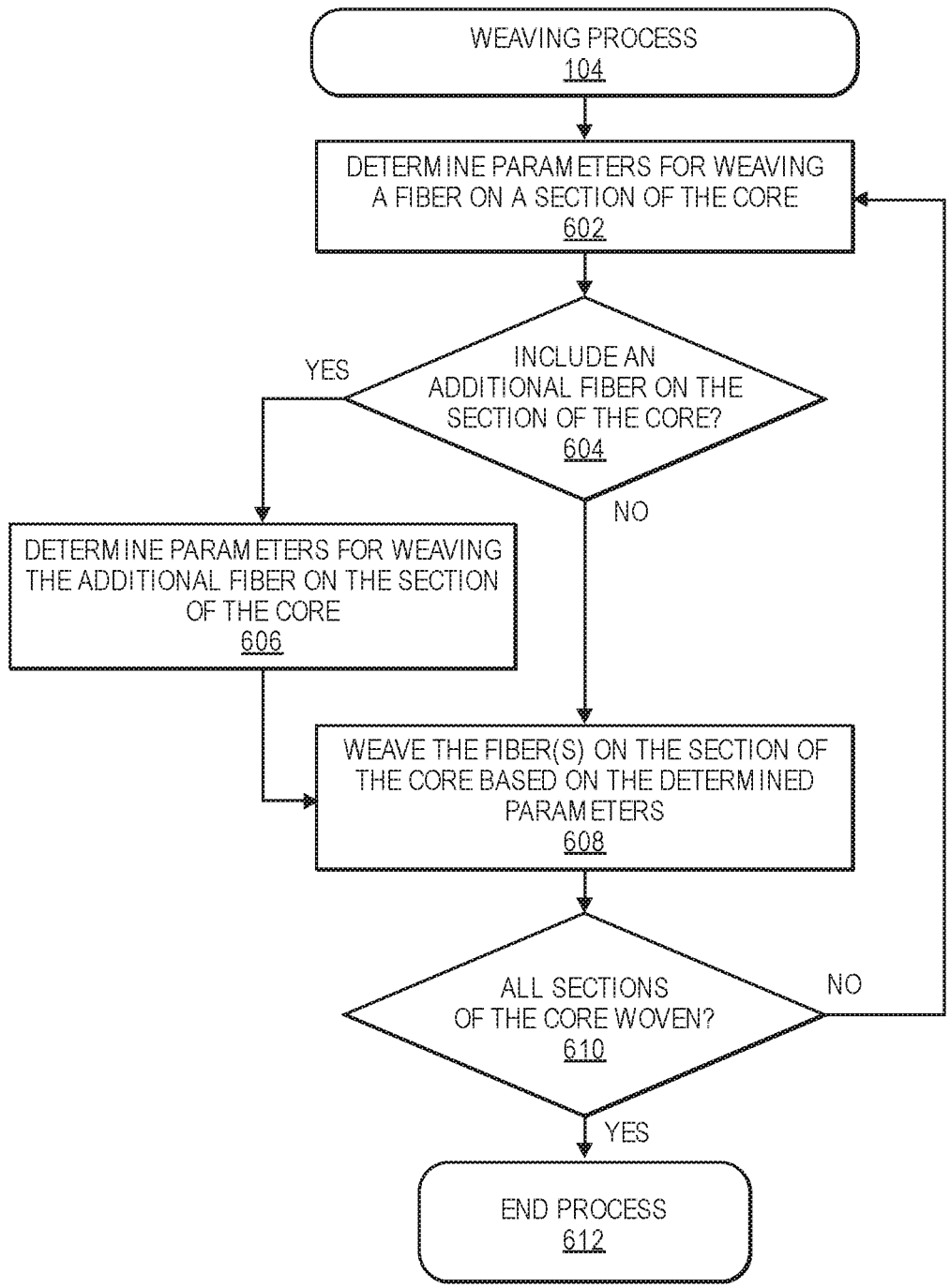
FIG. 6 is a flow diagram illustrating an example weaving process, according to an implementation.

The continuous manufacturing process 100 may continue with a weaving process 104, as described in further detail with respect to FIG. 6. The weaving process 104 may include weaving one or more fibers on a plurality of sections of the fixed inner core or the flexible inner core or die according to desired weaving parameters. The fibers may include various types of fibers, such as carbon fibers, glass fibers, aramid fibers including para-aramid fibers (e.g., Kevlar) or meta-aramid fibers, tubes, pipes, channels, or any other fibers or tapes that may be woven and cured as described herein. The weaving process 104 may proceed continuously as the fixed inner core is prepared or formed, or as the flexible inner core or die is extended or retracted.

The weaving parameters may include weaving angle, weaving direction, weaving density or spacing, fiber type, fiber size, a number of fiber layers, other parameters, or combinations thereof. For example, the fibers on a first section may be woven in multiple layers, with each layer oriented at relative angles of 0 degrees, 90 degrees, +45 degrees, and −45 degrees, and the fibers on a second section may be woven in multiple layers, with each layer oriented at relative angles of 0 degrees, 90 degrees, +60 degrees, −60 degrees, +30 degrees, and −30 degrees. In addition, multiple types or sizes of fibers may be woven together within a single layer or in multiple layers on a section. Any other combination of weaving parameters may be used to weave one or more fibers on each of the sections of the fixed inner core or the flexible inner core or die, and the weaving parameters may be selected to control properties of the woven fibers, such as strength, stiffness, flexibility, weight, other properties, or combinations thereof. Further, fibers may be woven over the plurality of sections of the fixed inner core or the flexible inner core or die with different weaving parameters associated with one or more of the sections, such that properties of the sections of the fiber components may be formed and controlled as desired.

The weaving process 104 may also include weaving one or more additional fibers over the sections of the fixed inner core or the flexible inner core or die. The additional fibers may be associated with additional functions or characteristics that may be embedded within or woven together with other fibers, which other fibers may primarily be used to impart desired structural properties or characteristics to sections of the fiber component. For example, the additional fibers may include conductors, insulators, wires, antennas, electromagnetic or radiofrequency signal transmitting fibers, electromagnetic or radiofrequency interference blocking fibers, tubes, pipes, channels, other fibers, or combinations thereof. The additional fibers may be selectively woven over particular sections of the fixed inner core or the flexible inner core or die to provide additional functions or characteristics as desired.

In some embodiments in which one or more fibers are woven around a flexible inner core or die, the one or more fibers may be woven around a second section of the flexible inner core. The second section may expand a nominal amount, e.g., a few millimeters, a few centimeters, a few inches, etc., thereby expanding the one or more woven fibers. After expanding the one or more woven fibers, the second section may contract such that the one or more woven fibers are released from direct contact with the second section. Then, the second section may be moved relative to the one or more woven fibers, e.g., withdrawn and retracted to a next section around which one or more fibers are to be woven as part of the continuous manufacturing process.

Figure 7A:
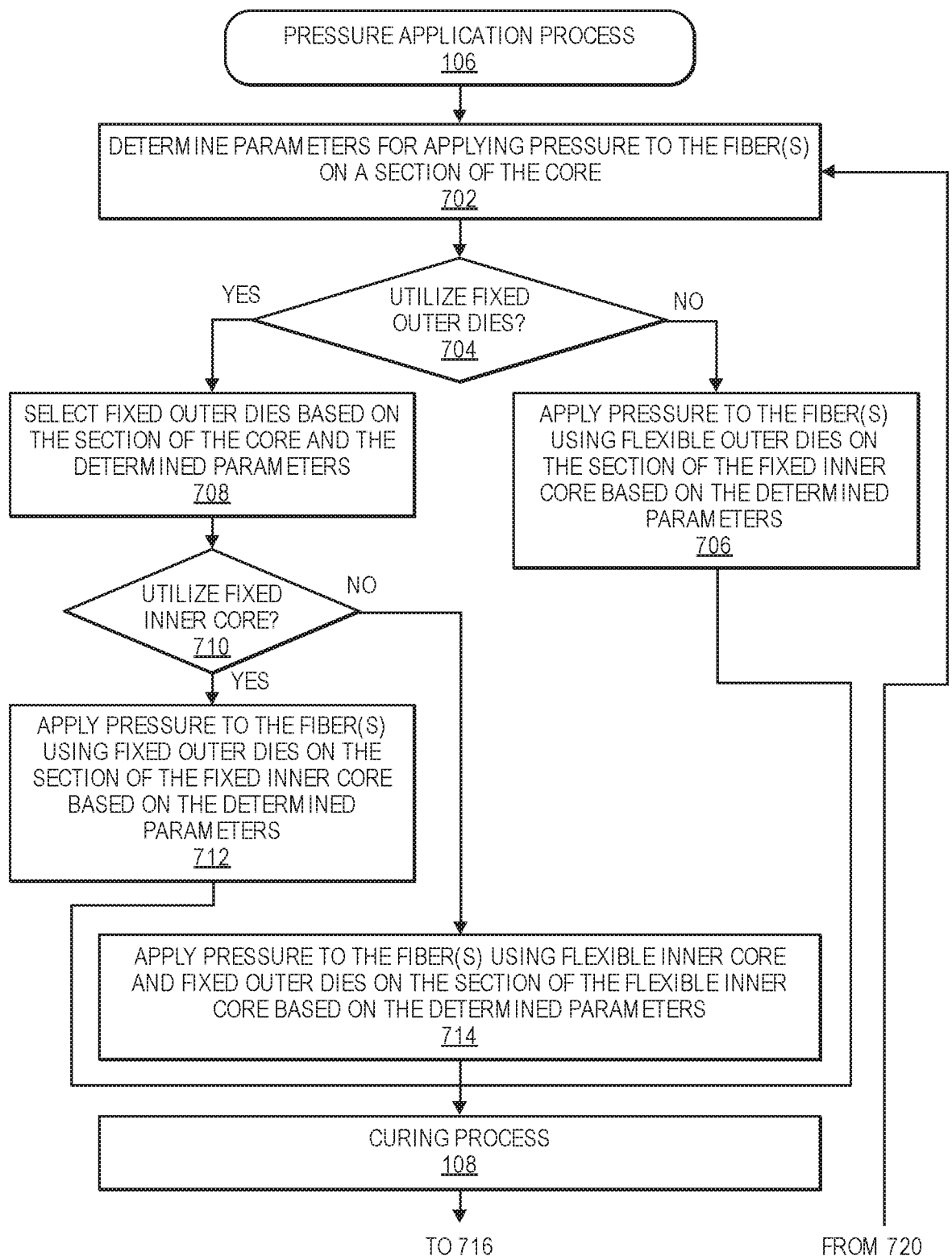
FIGS. 7A-7B is a flow diagram illustrating an example pressure application process, according to an implementation.
Figure 7B:
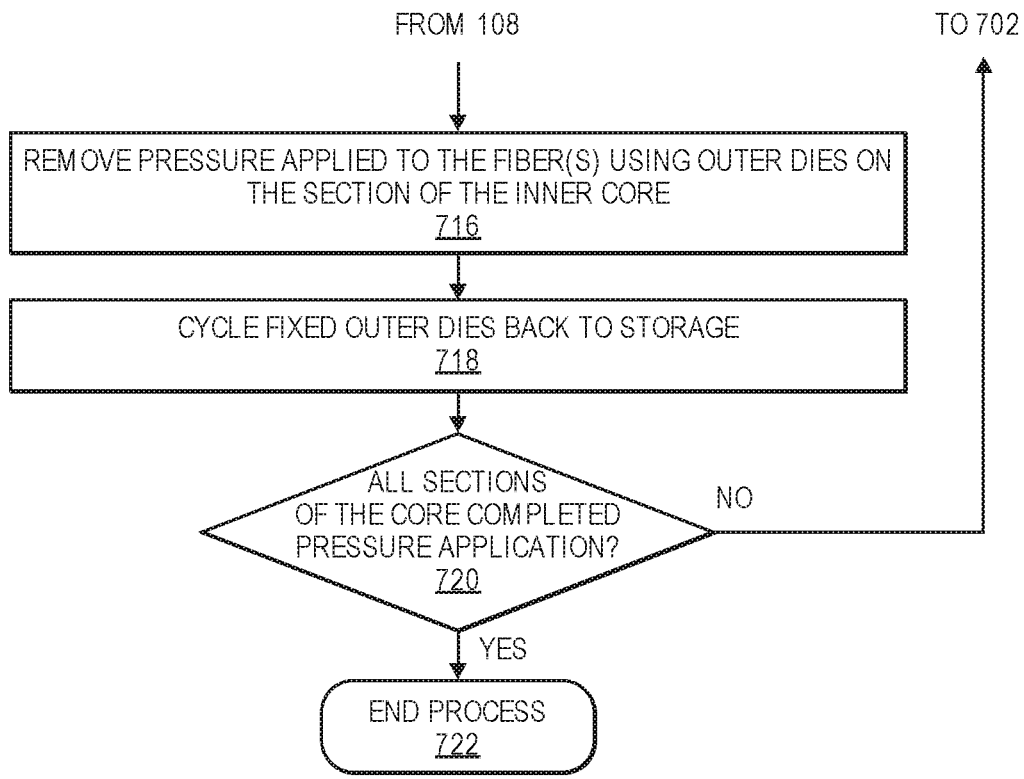

The continuous manufacturing process 100 may continue with a pressure application process 106, as described in further detail with respect to FIGS. 7A and 7B. The pressure application process 106 may include applying pressure to woven fibers around each of the plurality of sections of the inner core according to desired pressure application parameters. The pressure application process 106 may proceed continuously as the fibers are woven on the plurality of sections of the inner core.

In some embodiments using a fixed inner core, the pressure may be applied using one or more outer dies that compress the woven fibers on a section the fixed inner core. The one or more outer dies may be fixed outer dies or flexible outer dies. Fixed outer dies may have fixed internal dimensions that apply pressure to the woven fibers on the section of the fixed inner core such that the woven fibers conform to the fixed internal dimensions of the fixed outer dies. Flexible outer dies may have expandable internal surfaces that can expand to apply pressure to the woven fibers on the section of the fixed inner core.

In other embodiments using a flexible inner core, the pressure may be applied using the flexible inner core and one or more outer dies that compress the woven fibers on a section of the flexible inner core. The one or more outer dies may be fixed outer dies that have fixed internal dimensions, such that the woven fibers on the section of the flexible inner core conform to the fixed internal dimensions of the fixed outer dies upon application of pressure. The flexible inner core may expand to apply pressure to the woven fibers on the section of the flexible inner core against the fixed internal dimensions of the fixed outer dies.

The fixed outer dies may be held in storage, e.g., on a pallet system, and selected as needed based on the section of the inner core and the desired pressure application parameters. When selected, the fixed outer dies may be removed from storage and brought to the continuous manufacturing process, e.g., on a pallet system. The fixed outer dies may then be loaded into the continuous manufacturing process to apply pressure to the section of the inner core. Likewise, the flexible outer dies may also be held in storage, e.g., on a pallet system, selected as needed based on the section of the inner core and the desired pressure application parameters, removed from storage and brought to the continuous manufacturing process, e.g., on a pallet system, and loaded into the continuous manufacturing process to apply pressure to the section of the inner core. Alternatively, the flexible outer dies may not be removed or placed in storage, and may instead remain as part of the continuous manufacturing process, and the flexible outer dies may cycle between the pressure application process 106, the curing process 108, and/or the cooling process 110, as described herein.

The pressure application parameters may be controlled to apply a desired amount of pressure to a section of the fiber component. Further, the fiber component may have different pressure application parameters associated with one or more of the plurality of sections, such that properties of the sections of the fiber components may be formed and controlled as desired.

Figure 8:
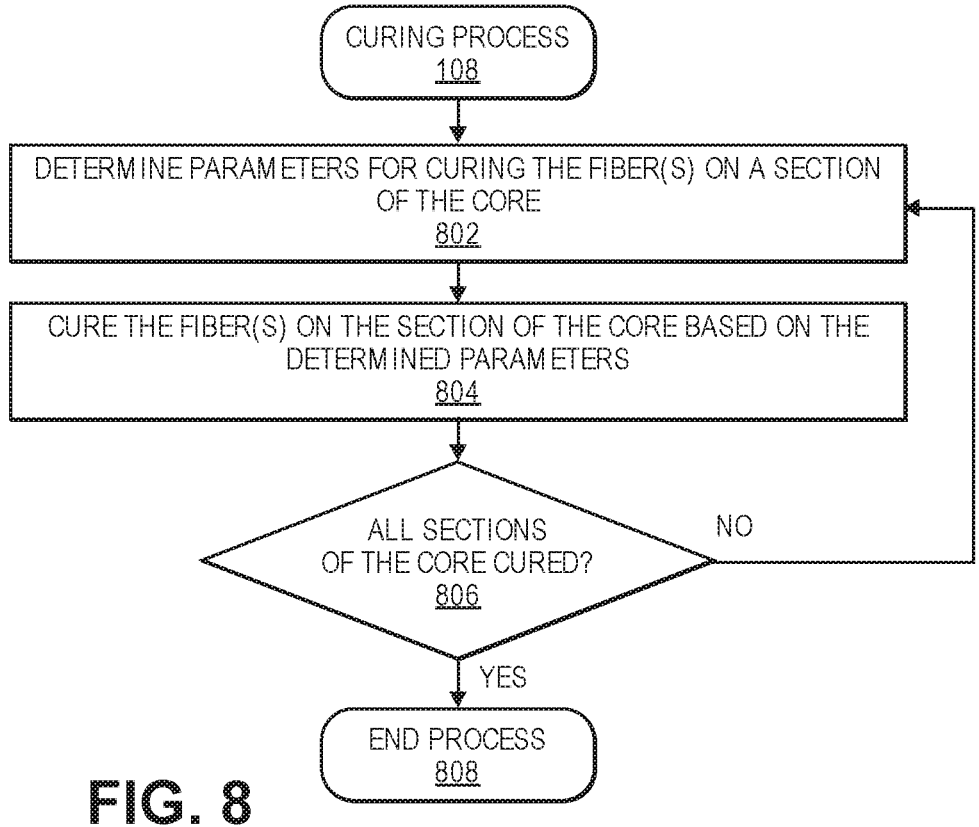
FIG. 8 is a flow diagram illustrating an example curing process, according to an implementation.

The continuous manufacturing process 100 may continue with a curing process 108, as described in further detail with respect to FIG. 8. The curing process 108 may include applying heat and pressure to woven fibers around each of the plurality of sections of the inner core according to desired curing parameters. The curing process 108 may proceed continuously as pressure is applied to the fibers woven on the plurality of sections of the inner core.

In some embodiments using a fixed inner core, heat may be applied using a curing oven through which the one or more outer dies that have compressed the woven fibers on a section of the fixed inner core pass. Alternatively or in addition, heat may be applied directly to the woven fibers on a section of the fixed inner core by the one or more outer dies.

In other embodiments using a flexible inner core, heat may be applied using a curing oven through which the flexible inner core and the one or more outer dies that have compressed the woven fibers on a section of the flexible inner core pass. Alternatively or in addition, heat may be applied directly to the woven fibers on a section of the flexible inner core by the flexible inner core and/or the one or more outer dies.

The curing parameters may be controlled to apply a desired amount of heat for a desired amount of time to a section of the fiber component. Further, the fiber component may have different curing parameters associated with one or more of the plurality of sections, such that properties of the sections of the fiber components may be formed and controlled as desired.

Figure 9:
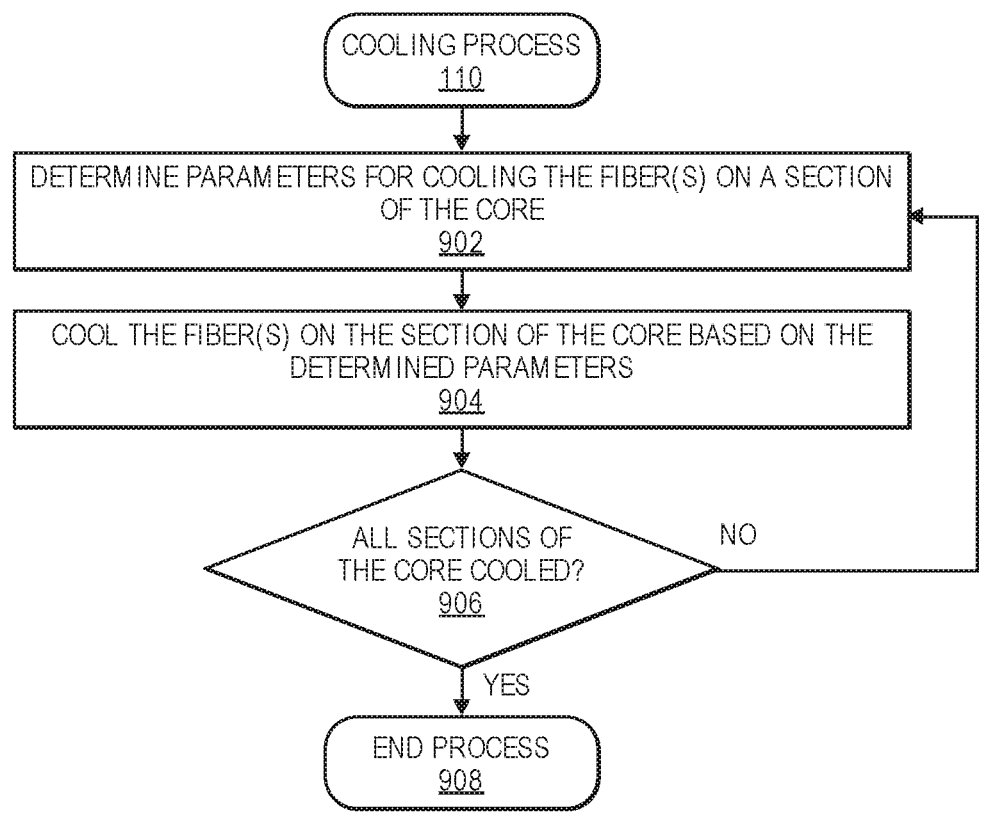
FIG. 9 is a flow diagram illustrating an example cooling process, according to an implementation.

The continuous manufacturing process 100 may continue with a cooling process 110, as described in further detail with respect to FIG. 9. The cooling process 110 may include removing heat and pressure from woven fibers around each of the plurality of sections of the inner core according to desired cooling parameters. The cooling process 110 may proceed continuously as the fibers woven on the plurality of sections of the inner core are cured.

In some embodiments using a fixed inner core, heat and pressure may be removed from the cured woven fibers on a section of the fixed inner core by releasing the pressure applied by the one or more outer dies and/or passing the section of the fixed inner core and cured woven fibers out of the curing oven. Alternatively or in addition, heat may no longer be applied directly to the cured woven fibers on a section of the fixed inner core by the one or more outer dies. Further, heat may be removed from the cured woven fibers by additional processes, such as forced air cooling, water cooling, dipping or submerging the woven fibers in a cooling bath, other cooling processes, or combinations thereof.

In other embodiments using a flexible inner core, heat and pressure may be removed from the cured woven fibers on a section of the flexible inner core by releasing the pressure applied by the flexible inner core and/or the one or more outer dies, contracting and withdrawing the flexible inner core from the cured woven fibers, and/or passing the section of the cured woven fibers out of the curing oven. Alternatively or in addition, heat may no longer be applied directly to the cured woven fibers by the flexible inner core and/or the one or more outer dies. Further, heat may be removed from the cured woven fibers by additional processes, such as forced air cooling, water cooling, dipping or submerging the woven fibers in a cooling bath, other cooling processes, or combinations thereof.

The fixed outer dies may then be returned to storage, e.g., on a pallet system, such that they may be available as needed for subsequent sections of fiber components. Likewise, the flexible outer dies may also be returned to storage, e.g., on a pallet system, such that they may be available as needed for subsequent sections of fiber components. Alternatively, the flexible outer dies may not be removed or placed in storage, and may instead remain as part of the continuous manufacturing process, and the flexible outer dies may cycle between the pressure application process 106, the curing process 108, and/or the cooling process 110, as described herein.

The cooling parameters may be controlled to remove a desired amount of heat for a desired amount of time from a section of the fiber component. Further, the fiber component may have different cooling parameters associated with one or more of the plurality of sections, such that properties of the sections of the fiber components may be formed and controlled as desired.

The continuous manufacturing process 100 may continue with post-processing 112. For example, post-processing may include various cutting, drilling, grinding, surface finishing, painting, coating, or other processing. In addition, if a fixed inner core was used, the material of the fixed inner core may be dissolved or otherwise removed, e.g., through the use of particular chemicals or solvents, or other removal methods. Further, if additional fibers having different functions or characteristics have been woven into the fiber components, the fiber components may undergo various electrical connection, power connection, communication connection, or other processing associated with the functions or characteristics of the additional fibers. Moreover, the fiber component may have different post-processing associated with one or more of the plurality of sections, such that properties of the sections of the fiber components may be formed and controlled as desired. The post-processing 112 may proceed continuously as the fibers woven on the plurality of sections of the inner core are cured and/or cooled.

The continuous manufacturing process 100 may then end, as at 114, with the completion of the continuous manufacture of a fiber component having a plurality of sections according to a desired shape, and having particular weaving parameters, structural properties or characteristics, and/or additional functions or characteristics that may differ between each of the plurality of sections of the continuously manufactured fiber component.

Figure 2:
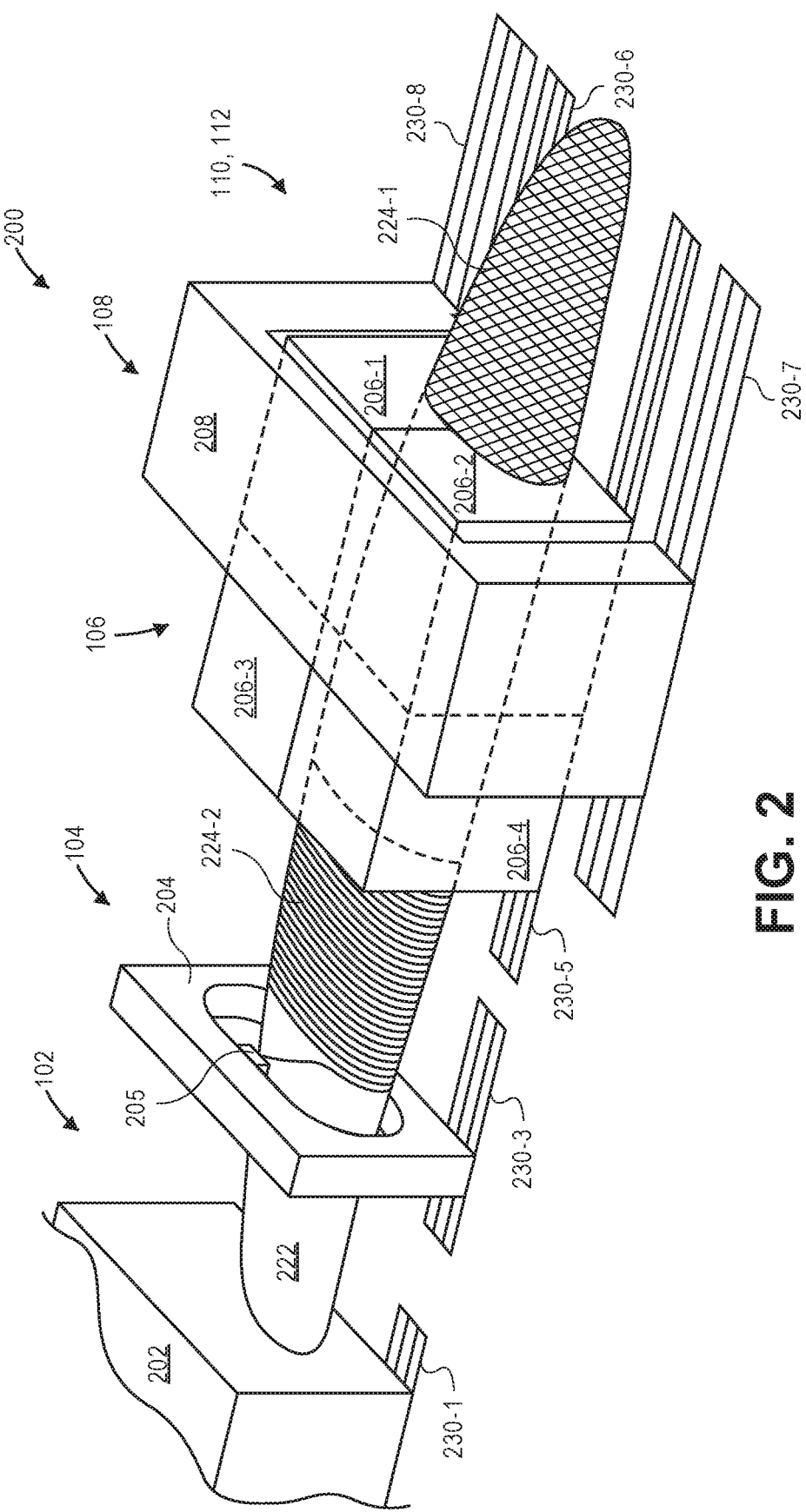
FIG. 2 is a schematic diagram of a first example continuous manufacturing system, according to an implementation.

FIG. 2 is a schematic diagram of a first example continuous manufacturing system 200, according to an implementation. The first example continuous manufacturing system 200 may include a core preparation subsystem 202 that performs the core preparation process 102, a weaving subsystem 204 that performs the weaving process 104, one or more outer dies 206 that perform the pressure application process 106, a curing oven 208 that performs the curing process 108, and cooling and/or post-processing subsystems (not shown) that perform the cooling process 110 and/or post-processing 112.

The core preparation subsystem 202 of the first example continuous manufacturing system 200 may form a fixed inner core 222 according to a desired shape using various processes including extrusion, cutting, grinding, sanding, polishing, forming, 3D printing, other processes, or combinations thereof. The fixed inner core 222 may be formed of various materials, such as foam, plastic, wood, other materials, or combinations thereof. The fixed inner core 222 may be formed to desired dimensions or parameters such that fibers that are woven, cured, cooled, and/or post-processed on the fixed inner core 222 achieve desired final dimensions or parameters of a fiber component. The fixed inner core 222 may be formed as a plurality of sections, in which each of the plurality of sections may be continuously processed in sequence by the subsystems of the first example continuous manufacturing system 200.

The weaving subsystem 204 of the first example continuous manufacturing system 200 may weave one or more fibers over each of the plurality of sections of the fixed inner core 222 according to desired weaving parameters, in which the weaving parameters may include weaving angle, weaving direction, weaving density or spacing, fiber type, fiber size, a number of fiber layers, other parameters, or combinations thereof. The fibers may include various types of fibers, such as carbon fibers, glass fibers, aramid fibers including para-aramid fibers (e.g., Kevlar) or meta-aramid fibers, tubes, pipes, channels, or any other fibers or tapes that may be woven and cured as described herein.

The weaving subsystem 204 may include one or more weaving heads 205 that may move within or around a frame of the weaving subsystem 204 in order to weave one or more fibers around a periphery of the fixed inner core 222. For example, as shown in FIG. 2, the weaving head 205 may weave one or more fibers in a desired pattern 224-2 on a section of the fixed inner core 222. In addition, as shown in FIG. 2, the weaving head 205 may weave one or more fibers in a desired pattern 224-1 on a different section of the fixed inner core 222. Other sections may include fibers woven according to any other desired weaving parameters, and each section may also include multiple subsections of fibers woven according to desired weaving parameters.

Although FIG. 2 shows one weaving head 205 and one weaving subsystem 204, the first example continuous manufacturing system 200 may include multiple weaving heads 205 on the weaving subsystem 204, and may also include multiple weaving subsystems 204. Each of the multiple weaving heads 205 may include different fiber types or sizes. In addition, a single weaving subsystem 204 may weave multiple layers of fibers on the fixed inner core 222, and/or multiple weaving subsystems 204 in sequence may weave multiple layers of fibers on the fixed inner core 222. In addition, the weaving subsystem(s) 204 and/or the fixed inner core 222 may move relative to each other to effect different weaving angles, directions, density or spacing.

Further, the weaving subsystem 204 may weave one or more fibers that function as fiducial marks or identifiers for downstream subsystems. For example, the one or more fibers may have a different color or other detectable property than surrounding fibers, and/or may be woven in a particular, detectable pattern. The one or more fibers that form the fiducial marks or identifiers may be detected by imaging devices or sensors of downstream subsystems and signal particular downstream processes. In one example embodiment, a different color fiber may be detected during post-processing and may trigger and/or guide particular post-processing, such as a cutting operation along the different color fiber. In another example embodiment, one or more fibers formed as a fiducial or identifier on a surface of the fiber component may be detected during post-processing and may trigger and/or guide particular post-processing, such as a coating, painting, or surface finishing operation on the surface associated with the fiducial or identifier.

In addition, the weaving subsystem 204 may weave one or more additional fibers on one or more sections of the plurality of sections of the fixed inner core 222. The additional fibers may include conductors, insulators, wires, antennas, electromagnetic or radiofrequency signal transmitting fibers, electromagnetic or radiofrequency interference blocking fibers, tubes, pipes, channels, other fibers, or combinations thereof. For example, by weaving conductors or wires by the weaving subsystem 204, subsequent post-processing steps such as routing electrical, power, or communication wires may be reduced or eliminated. Conductors may also be woven into the fiber component in a mesh or other pattern and may operate as heating or de-icing elements, e.g., for vehicle or component surfaces. In addition, by weaving electromagnetic or radiofrequency interference blocking fibers by the weaving subsystem 204, electronic components contained within the fiber component may be shielded from electromagnetic or radiofrequency interference.

Further, conductive fibers may be woven and desired electrical components may be placed to form one or more electrical circuits embedded into one or more sections of the fiber component. For example, electrical components, such as resistors, capacitors, transistors, diodes or other components, of one or more electrical circuits may be placed at desired locations within woven fibers, using portions of the weaving subsystems and/or one or more additional electromechanical systems, e.g., robotic arms, at desired times during the continuous manufacturing process. Various portions of such electrical circuits may be woven using fibers, e.g., conductors, as described herein, while various other electrical components or materials may be placed and connected to the woven fibers at desired locations and times using automated processes.

The weaving subsystem 204 may continuously weave one or more fibers on each of the plurality of sections of the fixed inner core 222, in which each of the sections, or subsections thereof, may be woven according to different weaving parameters.

The pressure application subsystem of the first example continuous manufacturing system 200 may apply pressure to one or more woven fibers on each of the plurality of sections of the fixed inner core 222 according to desired pressure application parameters. The pressure application subsystem may include one or more outer dies 206 that apply pressure to an outer surface of the woven fibers on the fixed inner core 222. For example, as shown in FIG. 2, outer dies 206-3, 206-4 may apply pressure to the woven fibers on the section of the fixed inner core 222. Although two outer dies are shown as applying pressure to each section of the fixed inner core 222, any other number or configuration of outer dies may be used.

The one or more outer dies 206 may be fixed outer dies or flexible outer dies. Fixed outer dies may define an internal surface that will apply pressure to the woven fibers on the section of the fixed inner core 222 to achieve desired final dimensions of the section of the fiber component. The fixed outer dies may be held in storage, brought to the first example continuous manufacturing system 200 as needed to process a section of the fixed inner core 222, e.g., using a pallet system, and then returned to storage after completion of processing. Flexible outer dies may have expandable inner surfaces that apply pressure to the woven fibers on the section of the fixed inner core 222. The flexible outer dies may also be held in storage, brought to the first example continuous manufacturing system 200 as needed to process a section of the fixed inner core 222, e.g., using a pallet system, and then returned to storage after completion of processing. Alternatively, the flexible outer dies may remain as part of the first example continuous manufacturing system 200 and cycle between the pressure application subsystem, the curing oven 208, and/or the cooling and/or post-processing subsystems.

The pressure application subsystem may continuously apply pressure to one or more fibers on each of the plurality of sections of the fixed inner core 222, using one or more outer dies 206 that are cycled between processing steps according to desired pressure application parameters.

The curing subsystem of the first example continuous manufacturing system 200 may cure the one or more woven fibers on each of the plurality of sections of the fixed inner core 222 according to desired curing parameters. The curing subsystem may include a curing oven 208 through which the one or more outer dies 206 that apply pressure to the outer surface of the woven fibers on the fixed inner core 222 pass. For example, as shown in FIG. 2, outer dies 206-1, 206-2 may pass into and through the curing oven 208 while applying pressure to the woven fibers on the section of the fixed inner core 222. Although two outer dies are shown as passing into and through the curing oven 208, any other number or configuration of outer dies may be used. Alternatively or in addition, the one or more outer dies may apply heat directly to the outer surface of the woven fibers on the fixed inner core 222.

The curing subsystem may continuously cure the one or more fibers on each of the plurality of sections of the fixed inner core 222, using the curing oven 208 and/or the one or more outer dies 206 that apply heat and pressure to each of the plurality of sections according to desired curing parameters.

The cooling subsystem of the first example continuous manufacturing system 200 may cool the one or more woven fibers on each of the plurality of sections of the fixed inner core 222 according to desired cooling parameters. The cooling subsystem may include removing the heat and/or pressure applied by the curing oven 208 and/or the one or more outer dies 206 to the outer surface of the woven fibers on the fixed inner core 222. Alternatively or in addition, heat may be removed from the woven fibers by additional processes, such as forced air cooling, water cooling, dipping or submerging the woven fibers in a cooling bath, other cooling processes, or combinations thereof. For example, as shown in FIG. 2, outer dies 206 may be removed from the first example continuous manufacturing system 200 after passing through the curing oven 208. The outer dies may then be returned to storage, e.g., using a pallet system. Alternatively, if flexible outer dies are used, the flexible outer dies may cycle back to a previous processing step of the first example continuous manufacturing system 200.

The cooling subsystem may continuously cool the one or more fibers on each of the plurality of sections of the fixed inner core 222, by removing heat and pressure applied by the curing oven 208 and/or the one or more outer dies 206, and/or using additional cooling processes, from each of the plurality of sections according to desired cooling parameters.

The post-processing subsystem of the first example continuous manufacturing system 200 may perform various post-processing on the cured and/or cooled fibers on each of the plurality of sections of the fixed inner core 222. For example, post-processing may include various cutting, drilling, grinding, surface finishing, painting, coating, or other processing. In addition, if a fixed inner core was used, the material of the fixed inner core may be dissolved or otherwise removed, e.g., through the use of particular chemicals or solvents, or other removal methods. Further, if additional fibers having different functions or characteristics have been woven into the fiber components, the fiber components may undergo various electrical connection, power connection, communication connection, or other processing associated with the functions or characteristics of the additional fibers. The post-processing may proceed continuously on the one or more fibers on each of the plurality of sections of the fixed inner core 222 according to desired post-processing parameters.

Further, as shown in FIG. 2, the core preparation subsystem 202, the weaving subsystem 204, and/or the pressure application subsystem, curing subsystem, and/or cooling subsystem including one or more outer dies 206 may move along a direction of processing, e.g., along rails, guides, tracks, or other similar structures 230. For example, the core preparation subsystem 202 may move along track 230-1 and an additional that track (not shown) on an opposite side, the weaving subsystem 204 may move along track 230-3 and an additional track (not shown) on an opposite side, the one or more outer dies 206 may move along tracks 230-5, 230-6, and the curing oven 208 may move along tracks 230-7, 230-8. Although FIG. 2 indicates two tracks 230 for each subsystem, any other number or configuration of tracks 230 may be used. In addition, two or more of the core preparation subsystem 202, the weaving subsystem 204, the one or more outer dies 206, and the curing oven 208 may move along shared tracks 230 that extend continuously between two or more subsystems. In this manner, the various subsystems may continuously process various sections of a plurality of sections of a fixed inner core 222 at different rates according to desired parameters associated with each of the subprocesses 102, 104, 106, 108, 110, 112. Further, although not shown in FIG. 2, the fixed inner core 222 may be supported and/or moved along a direction of processing using one or more conveyance or guidance devices or mechanisms situated between the various subsystems.

Using the first example continuous manufacturing system 200 of FIG. 2, a fiber component may be formed having a plurality of sections according to a desired shape, and having particular weaving parameters, structural properties or characteristics, and/or additional functions or characteristics that may differ between each of the plurality of sections of the continuously manufactured fiber component.

Further, the first example continuous manufacturing system 200 may also include multiple systems in sequence to create continuously manufactured fiber components with more complex geometries, structures, or components. For example, following completion of curing, cooling, and/or post-processing subsystems as described herein, the fiber component may continue to a subsequent system that may include an additional core preparation subsystem, weaving subsystem, pressure application subsystem, curing subsystem, cooling subsystem, and/or post-processing subsystem. In one example embodiment, one or more spars may be continuously formed using a first system of the first example continuous manufacturing system 200, a wing may be continuously formed onto the one or more spars using a second system of the first example continuous manufacturing system 200, and one or more wing flaps may be continuously formed onto the wing using a third system of the first example continuous manufacturing system 200. Other compound fiber components may also be formed using multiple systems in sequence, such as, for example, an aircraft fuselage with canopy covers and doors. The fiber components may progress in this manner through multiple systems to create more complex geometries, structures, or components.

Figure 3:
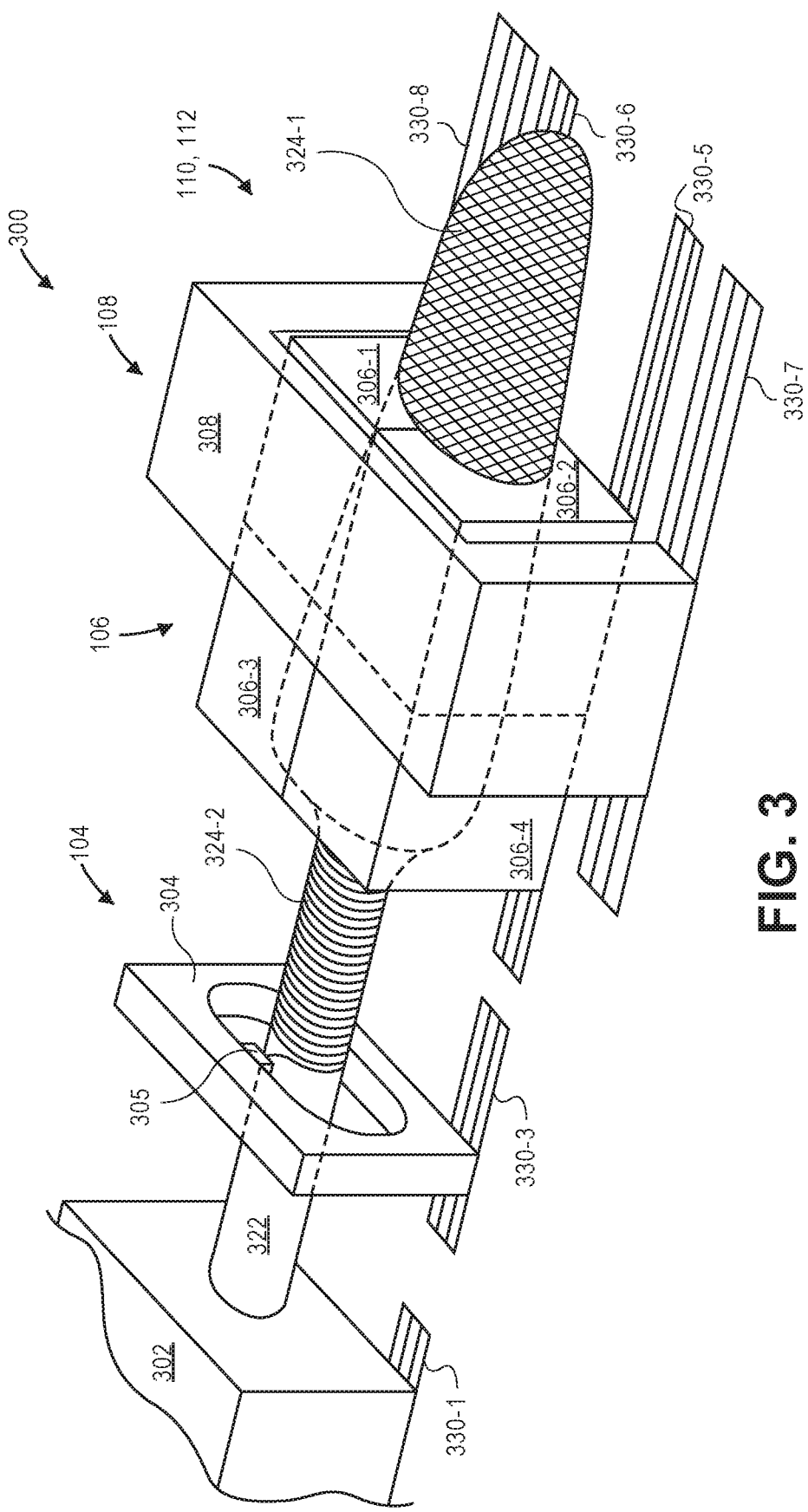
FIG. 3 is a schematic diagram of a second example continuous manufacturing system, according to an implementation.

FIG. 3 is a schematic diagram of a second example continuous manufacturing system 300, according to an implementation. The second example continuous manufacturing system 300 may include a core subsystem 302 that controls a flexible inner core, die, or tool 322, a weaving subsystem 304 that performs the weaving process 104, one or more outer dies 306 that perform the pressure application process 106, a curing oven 308 that performs the curing process 108, and cooling and/or post-processing subsystems (not shown) that perform the cooling process 110 and/or post-processing 112.

The core subsystem 302 of the second example continuous manufacturing system 300 may control a flexible inner core 322 according to desired processing parameters. The flexible inner core 322 may be formed of various materials, such as metal, plastic, wood, foam, expandable materials, other materials, or combinations thereof. The flexible inner core 322 may be advanced and/or withdrawn along a direction of processing between the weaving subsystem 304, the pressure application subsystem, the curing subsystem, and/or the cooling and/or post-processing subsystems.

Figure 4:
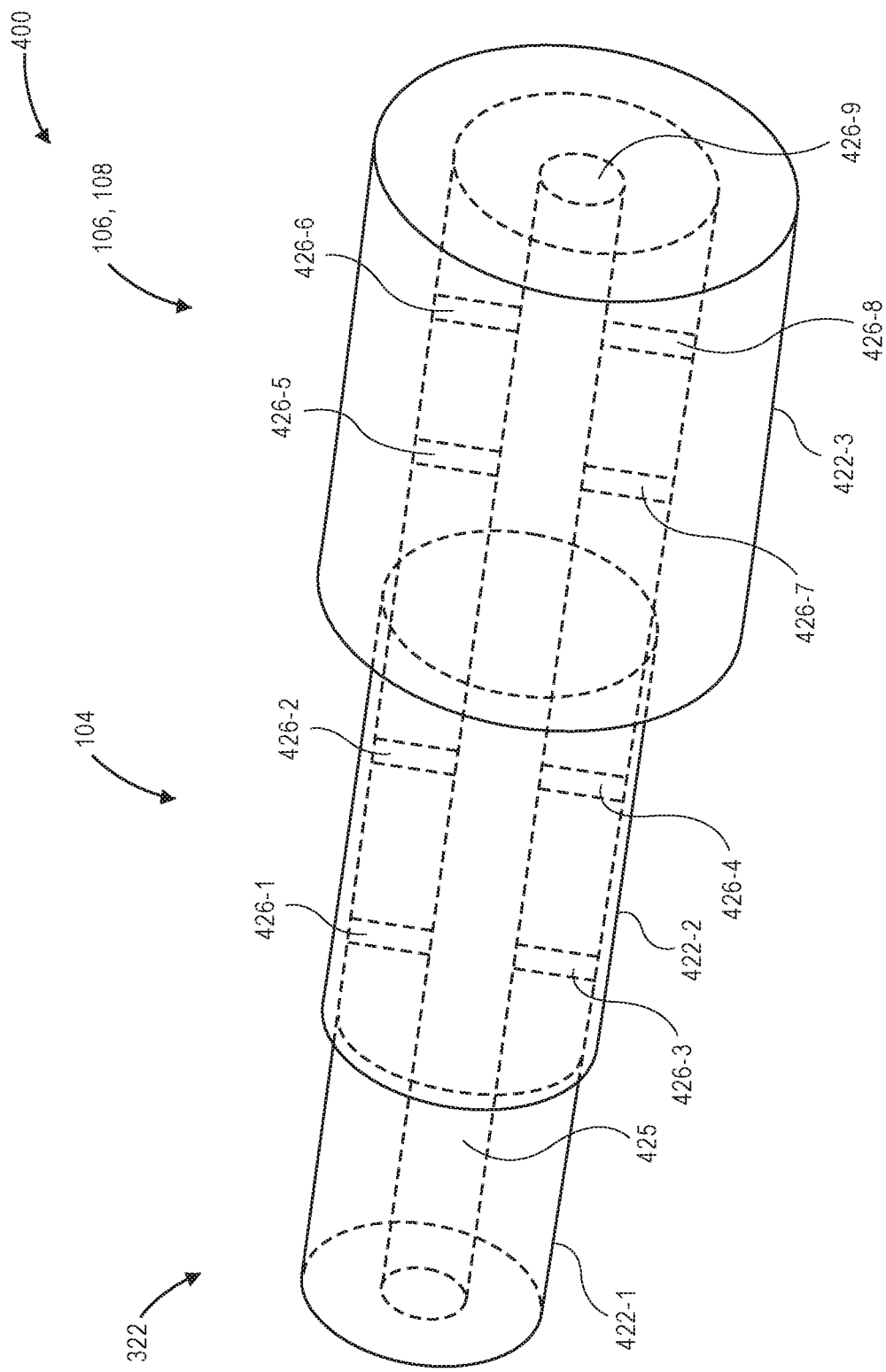
FIG. 4 is a schematic diagram of an example expandable inner core of the second example continuous manufacturing system, according to an implementation.

FIG. 4 is a schematic diagram 400 of an example expandable inner core 322 of the second example continuous manufacturing system 300, according to an implementation. The flexible inner core 322 may include a plurality of sections 422-1, 422-2, 422-3. A hollow core or channel 425 may extend through each of the plurality of sections 422, may be connected to a fluid or gas source to expand and/or contract one or more sections 422 of the flexible inner core 322, and may include valves or other components between and/or within one or more of the sections 422. The first section 422-1 may be a substantially fixed inner core that may be advanced and/or withdrawn along a direction of processing.

The second section 422-2 may include an expandable outer surface on which one or more fibers may be woven during the weaving process 104. The second section 422-2 may be expanded via one or more connections 426-1, 426-2, 426-3, 426-4 to the hollow core 425 and the fluid or gas source. The connections 426 may also include valves or other components to control the expansion of the second section 422-2. After one or more fibers are woven on the second section 422-2, the second section 422-2 may be expanded to expand the woven fibers and then contracted to release the woven fibers from the outer surface of the second section 422-2. In this manner, the flexible inner core 322 may be released from direct contact with woven fibers such that the flexible inner core 322 may be advanced and/or withdrawn along a direction of processing independently of the woven fibers.

The third section 422-3 may also include an expandable outer surface that may apply pressure during the pressure application process 106 and/or the curing process 108 to one or more fibers woven thereon. The third section 422-3 may be expanded via one or more connections 426-5, 426-6, 426-7, 426-8, 426-9 to the hollow core 425 and the fluid or gas source. The connections 426 may also include valves or other components to control the expansion of the third section 422-3. Upon advancing and/or withdrawing the third section 422-3 to a section of woven fibers, the third section 422-3 may be expanded to apply pressure to and/or cure the woven fibers. After the pressure application process 106 and/or the curing process 108, the third section 422-3 may be contracted to release the woven fibers from the outer surface of the third section 422-3. In this manner, the flexible inner core 322 may be advanced and/or withdrawn along a direction of processing independently of the woven fibers.

Although FIG. 4 shows three sections 422-1, 422-2, 422-3 of the flexible inner core 322, any other number or configuration of sections 422 of the flexible inner core 322 may be used. The example of FIG. 4 allows fibers to be woven on a section of the flexible inner core 322, released from the section of the flexible inner core 322, pressed by the pressure application process on a different section of the flexible inner core 322, and cured by the curing process on a different or same section of the flexible inner core 322. In addition, although FIG. 4 shows a particular number and configuration of connections 426 between a fluid or gas source and expandable sections of the flexible inner core 322, any other number or configuration of connections, valves, or other components may be used to selectively expand and contract sections 422 of the flexible inner core 322. Accordingly, the flexible inner core 322 of FIG. 4 may allow continuous manufacturing of a fiber component through the various processing steps described herein.

The weaving subsystem 304 of the second example continuous manufacturing system 300 may weave one or more fibers over each of the plurality of sections of the fiber component according to desired weaving parameters, in which the weaving parameters may include weaving angle, weaving direction, weaving density or spacing, fiber type, fiber size, a number of fiber layers, other parameters, or combinations thereof. The fibers may include various types of fibers, such as carbon fibers, glass fibers, aramid fibers including para-aramid fibers (e.g., Kevlar) or meta-aramid fibers, tubes, pipes, channels, or any other fibers or tapes that may be woven and cured as described herein.

The weaving subsystem 304 may include one or more weaving heads 305 that may move within or around a frame of the weaving subsystem 304 in order to weave one or more fibers around a periphery of the flexible inner core 322. For example, as shown in FIG. 3, the weaving head 305 may weave one or more fibers in a desired pattern 324-2 on a section of the flexible inner core 322. In addition, as shown in FIG. 3, the weaving head 305 may weave one or more fibers in a desired pattern 324-1 on a different section of the fiber component. Other sections may include fibers woven according to any other desired weaving parameters, and each section may also include multiple subsections of fibers woven according to desired weaving parameters.

Although FIG. 3 shows one weaving head 305 and one weaving subsystem 304, the second example continuous manufacturing system 300 may include multiple weaving heads 305 on the weaving subsystem 304, and may also include multiple weaving subsystems 304. Each of the multiple weaving heads 305 may include different fiber types or sizes. In addition, a single weaving subsystem 304 may weave multiple layers of fibers on the section of the flexible inner core 322, and/or multiple weaving subsystems 304 in sequence may weave multiple layers of fibers on the section of the flexible inner core 322. In addition, the weaving subsystem(s) 304 and/or the flexible inner core 322 may move relative to each other to effect different weaving angles, directions, density or spacing.

Further, because one or more sections of the flexible inner core 322 may expand the woven fibers to achieve desired final dimensions or parameters, the weaving parameters of the one or more fibers may be further determined and/or selected such that the desired structural properties or characteristics are achieved upon expanding the woven fibers from their initial position on a contracted section of the flexible inner core 322 to their final position on an expanded section of the flexible inner core 322.

Further, the weaving subsystem 304 may weave one or more fibers that function as fiducial marks or identifiers for downstream subsystems. For example, the one or more fibers may have a different color or other detectable property than surrounding fibers, and/or may be woven in a particular, detectable pattern. The one or more fibers that form the fiducial marks or identifiers may be detected by imaging devices or sensors of downstream subsystems and signal particular downstream processes. In one example embodiment, a different color fiber may be detected during post-processing and may trigger and/or guide particular post-processing, such as a cutting operation along the different color fiber. In another example embodiment, one or more fibers formed as a fiducial or identifier on a surface of the fiber component may be detected during post-processing and may trigger and/or guide particular post-processing, such as a coating, painting, or surface finishing operation on the surface associated with the fiducial or identifier.

In addition, the weaving subsystem 304 may weave one or more additional fibers on one or more sections of the plurality of sections of the fiber component. The additional fibers may include conductors, insulators, wires, antennas, electromagnetic or radiofrequency signal transmitting fibers, electromagnetic or radiofrequency interference blocking fibers, tubes, pipes, channels, other fibers, or combinations thereof. For example, by weaving conductors or wires by the weaving subsystem 304, subsequent post-processing steps such as routing electrical, power, or communication wires may be reduced or eliminated. Conductors may also be woven into the fiber component in a mesh or other pattern and may operate as heating or de-icing elements, e.g., for vehicle or component surfaces. In addition, by weaving electromagnetic or radiofrequency interference blocking fibers by the weaving subsystem 304, electronic components contained within the fiber component may be shielded from electromagnetic or radiofrequency interference.

Further, conductive fibers may be woven and desired electrical components may be placed to form one or more electrical circuits embedded into one or more sections of the fiber component. For example, electrical components, such as resistors, capacitors, transistors, diodes or other components, of one or more electrical circuits may be placed at desired locations within woven fibers, using portions of the weaving subsystems and/or one or more additional electromechanical systems, e.g., robotic arms, at desired times during the continuous manufacturing process. Various portions of such electrical circuits may be woven using fibers, e.g., conductors, as described herein, while various other electrical components or materials may be placed and connected to the woven fibers at desired locations and times using automated processes.

The weaving subsystem 304 may continuously weave one or more fibers on each of the plurality of sections of the fiber component as one or more sections of the flexible inner core 322 are expanded, contracted, advanced, and/or withdrawn, in which each of the sections of fibers, or subsections thereof, may be woven according to different weaving parameters.

The pressure application subsystem of the second example continuous manufacturing system 300 may apply pressure to one or more woven fibers on each of the plurality of sections of the fiber component according to desired pressure application parameters. The pressure application subsystem may include one or more sections of the flexible inner core 322 and/or one or more outer dies 306 that apply pressure to an outer surface of the woven fibers on the flexible inner core 322. For example, as shown in FIG. 3, a section of the flexible inner core 322 and/or outer dies 306-3, 306-4 may apply pressure to the woven fibers on the section of the flexible inner core 322. Although two outer dies are shown as applying pressure to each section of the flexible inner core 322, any other number or configuration of outer dies may be used.

The one or more outer dies 306 may be fixed outer dies. Fixed outer dies may define an internal surface that will apply pressure to the woven fibers on the section of the flexible inner core 322 to achieve desired final dimensions of the section of the fiber component. The fixed outer dies may be held in storage, brought to the second example continuous manufacturing system 300 as needed to process a section of the fiber component, e.g., using a pallet system, and then returned to storage after completion of processing.

The pressure application subsystem may continuously apply pressure to one or more fibers on each of the plurality of sections of the fiber component, using one or more sections of the flexible inner core 322 and/or one or more outer dies 306 that are cycled between processing steps according to desired pressure application parameters.

The curing subsystem of the second example continuous manufacturing system 300 may cure the one or more woven fibers on each of the plurality of sections of the fiber component according to desired curing parameters. The curing subsystem may include a curing oven 308 through which one or more sections of the flexible inner core 322 and/or the one or more outer dies 306 that apply pressure to the outer surface of the woven fibers on the section of the flexible inner core 322 pass. For example, as shown in FIG. 3, a section of the flexible inner core 322 and/or outer dies 306-1, 306-2 may pass into and through the curing oven 308 while applying pressure to the woven fibers on the section of the flexible inner core 322. Although two outer dies are shown as passing into and through the curing oven 308, any other number or configuration of outer dies may be used. Alternatively or in addition, the one or more sections of the flexible inner core 322 and/or the one or more outer dies may apply heat directly to the outer surface of the woven fibers on the section of the flexible inner core 322.

The curing subsystem may continuously cure the one or more fibers on each of the plurality of sections of the fiber component, using the curing oven 308, one or more sections of the flexible inner core 322, and/or the one or more outer dies 306 that apply heat and pressure to each of the plurality of sections according to desired curing parameters.

The cooling subsystem of the second example continuous manufacturing system 300 may cool the one or more woven fibers on each of the plurality of sections of the fiber component according to desired cooling parameters. The cooling subsystem may include removing the heat and/or pressure applied by the curing oven 308, the one or more sections of the flexible inner core 322, and/or the one or more outer dies 306 to the outer surface of the woven fibers on the fiber component. Alternatively or in addition, heat may be removed from the woven fibers by additional processes, such as forced air cooling, water cooling, dipping or submerging the woven fibers in a cooling bath, other cooling processes, or combinations thereof. For example, as shown in FIG. 3, the section of the flexible inner core 322 may be contracted and/or withdrawn, and/or the outer dies 306 may be removed from the second example continuous manufacturing system 300 after passing through the curing oven 308. The outer dies may then be returned to storage, e.g., using a pallet system.

The cooling subsystem may continuously cool the one or more fibers on each of the plurality of sections of the fiber component, by removing heat and pressure applied by the curing oven 308, the one or more sections of the flexible inner core 322, and/or the one or more outer dies 306, and/or using additional cooling processes, from each of the plurality of sections according to desired cooling parameters.

The post-processing subsystem of the second example continuous manufacturing system 300 may perform various post-processing on the cured and/or cooled fibers on each of the plurality of sections of the fiber component. For example, post-processing may include various cutting, drilling, grinding, surface finishing, painting, coating, or other processing. In addition, if additional fibers having different functions or characteristics have been woven into the fiber components, the fiber components may undergo various electrical connection, power connection, communication connection, or other processing associated with the functions or characteristics of the additional fibers. The post-processing may proceed continuously on the one or more fibers on each of the plurality of sections of the fiber component according to desired post-processing parameters.

Further, as shown in FIG. 3, the core subsystem 302, the weaving subsystem 304, and/or the pressure application subsystem, curing subsystem, and/or cooling subsystem including one or more outer dies 306 may move along a direction of processing, e.g., along rails, guides, tracks, or other similar structures 330. For example, the core subsystem 302 may move along track 330-1 and an additional that track (not shown) on an opposite side, the weaving subsystem 304 may move along track 330-3 and an additional track (not shown) on an opposite side, the one or more outer dies 306 may move along tracks 330-5, 330-6, and the curing oven 308 may move along tracks 330-7, 330-8. Although FIG. 3 indicates two tracks 330 for each subsystem, any other number or configuration of tracks 330 may be used. In addition, two or more of the core subsystem 302, the weaving subsystem 304, the one or more outer dies 306, and the curing oven 308 may move along shared tracks 330 that extend continuously between two or more subsystems. In this manner, the various subsystems may continuously process various sections of a plurality of sections of a fiber component at different rates according to desired parameters associated with each of the subprocesses. Further, although not shown in FIG. 3, the one or more sections of the flexible inner core 322 and the one or more sections of the fiber component may be supported and/or moved along a direction of processing using one or more conveyance or guidance devices or mechanisms situated between the various subsystems.

Using the second example continuous manufacturing system 300 of FIG. 3, a fiber component may be formed having a plurality of sections according to a desired shape, and having particular weaving parameters, structural properties or characteristics, and/or additional functions or characteristics that may differ between each of the plurality of sections of the continuously manufactured fiber component.

Further, the second example continuous manufacturing system 300 may also include multiple systems in sequence to create continuously manufactured fiber components with more complex geometries, structures, or components. For example, following completion of curing, cooling, and/or post-processing subsystems as described herein, the fiber component may continue to a subsequent system that may include an additional core subsystem, weaving subsystem, pressure application subsystem, curing subsystem, cooling subsystem, and/or post-processing subsystem. In one example embodiment, one or more spars may be continuously formed using a first system of the second example continuous manufacturing system 300, a wing may be continuously formed onto the one or more spars using a second system of the second example continuous manufacturing system 300, and one or more wing flaps may be continuously formed onto the wing using a third system of the second example continuous manufacturing system 300. Other compound fiber components may also be formed using multiple systems in sequence, such as, for example, an aircraft fuselage with canopy covers and doors. The fiber components may progress in this manner through multiple systems to create more complex geometries, structures, or components.

Figure 5:
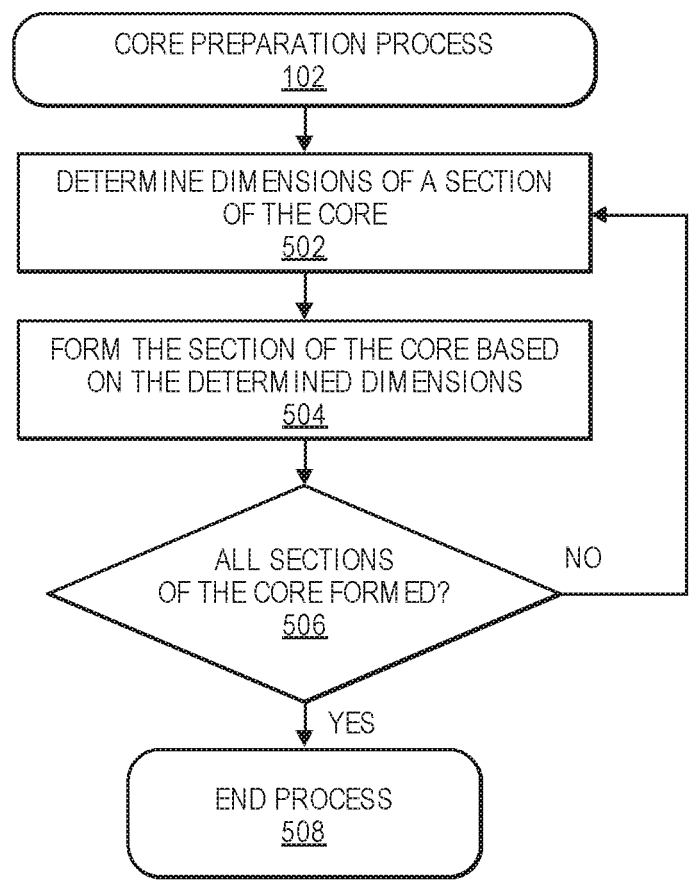
FIG. 5 is a flow diagram illustrating an example core preparation process, according to an implementation.

FIG. 5 is a flow diagram illustrating an example core preparation process 102, according to an implementation. The example core preparation process 102 may relate to the first example continuous manufacturing system 200, in which a fixed inner core 222 is formed around which one or more fibers are woven, compressed, cured, cooled, and/or post-processed.

The core preparation process 102 may begin by determining dimensions of a section of the core to be formed, as at 502. The dimensions of the section of the fixed inner core may be determined based at least in part on desired final dimensions of the section of the fiber component. In addition, the dimensions of the section of the fixed inner core may be determined based at least in part on the weaving parameters. For example, if a particular fiber type or size is to be woven on the section, and/or if a particular number of layers of fibers are to be woven on the section, the dimensions of the section of the fixed inner core may be determined based on such weaving parameters, in order to achieve the desired final dimensions of the section of the fiber component after completion of all subprocesses of the continuous manufacturing process. The core preparation process 102 may continue by forming the section of the core based on the determined dimensions, as at 504. As described herein, the section of the core may be formed using various processes, such as extrusion, cutting, grinding, sanding, polishing, forming, 3D printing, other processes, or combinations thereof.

Then, the core preparation process 102 may determine whether all sections of the core have been formed, as at 506. If it is determined that there are further sections of the fixed inner core to be formed, then the process returns to 502 to determine dimensions of the next section of the core to be formed. If it is determined at 506 that all sections of the core have been formed, then the core preparation process 102 may end, as at 508.

FIG. 6 is a flow diagram illustrating an example weaving process 104, according to an implementation. The example weaving process 104 may relate to the first or second example continuous manufacturing systems 200, 300, in which one or more fibers are woven around a section of a fixed inner core 222 or a section of a flexible inner core 322, e.g., second section 422-2.

The weaving process 104 may begin by determining parameters for weaving one or more fibers on a section of a core, as at 602. As set forth herein, the weaving parameters may include weaving angle, weaving direction, weaving density or spacing, fiber type, fiber size, a number of fiber layers, other parameters, or combinations thereof. The weaving parameters may be determined based on desired properties of the section of the fiber component, in which the properties may include strength, stiffness, flexibility, weight, other properties, or combinations thereof. In addition, whereas the section of the fixed inner core 222 may approximate the desired final dimensions of the woven fibers on the section of the fiber component, the weaving parameters for the section of the flexible inner core 322 may further take into account the expansion of the woven fibers by one or more sections of the flexible inner core 322, such that desired final dimensions, as well as desired properties, of the woven fibers are achieved by the expanded section of the woven fibers.

The weaving process 104 may continue by determining whether any additional fibers or materials are to be included on the section of the core, as at 604. As set forth herein, the additional fibers or materials may include conductors, insulators, wires, antennas, electromagnetic or radiofrequency signal transmitting fibers, electromagnetic or radiofrequency interference blocking fibers, tubes, pipes, channels, other fibers, or combinations thereof. If it is determined that additional fibers are to be included on the section of the core, then the weaving process 104 may continue to determine parameters for weaving the additional fibers on the section of the core, as at 606. The weaving parameters for the additional fibers may include the same parameters as those for the other fibers on the section of the core. In addition, the weaving parameters may further take into account the additional functions or characteristics of the additional fibers, such that the additional fibers are woven to maintain or achieve such additional functions or characteristics. For example, the additional fibers may be woven in particular patterns, in particular layers, or at particular orientations based on their additional functions or characteristics. Moreover, additional fibers such as conductors, wires, antennas, tubes, pipes, channels, or other transmitting fibers may be woven such that at least one contact or portion of the additional fibers are accessible at one or more edges or surfaces of the fiber component, to facilitate post-processing such as electrical connection, power connection, communication connection, or other processing.

After determining parameters for weaving any additional fibers, or if no additional fibers are to be included, the weaving process 104 may continue by weaving the fibers, and any additional fibers, on the section of the core based on the determined parameters, as at 608. For example, one or more weaving heads may apply the fibers, and any additional fibers, to the section of the core based on the determined parameters. Then, the weaving process 104 may determine whether all sections of the core or fiber component have been woven, as at 610. If it is determined that there are further sections of the core or fiber component to be woven, then the process returns to 602 to determine weaving parameters of the next section of the core or fiber component to be woven. If it is determined at 610 that all sections of the core or fiber component have been woven, then the weaving process 104 may end, as at 612.

FIGS. 7A and 7B is a flow diagram illustrating an example pressure application process 106, according to an implementation. The example pressure application process 106 may relate to the first or second example continuous manufacturing systems 200, 300, in which pressure is applied to one or more fibers woven around a section of a fixed inner core 222 or a section of a flexible inner core 322, e.g., third section 422-3.

The pressure application process 106 may begin by determining parameters for applying pressure to one or more fibers on a section of a core, as at 702. The parameters for applying pressure may include an amount of pressure, a duration of pressure application, a rate of pressure application, or other parameters. In addition, the parameters for applying pressure may be determined based at least in part on a core material, any of the weaving parameters, properties or characteristics of the inner and/or outer dies, an ambient temperature, other parameters, or combinations thereof.

The pressure application process 106 may continue by determining whether fixed outer dies are to be used, as at 704. If fixed outer dies are not to be used and instead flexible outer dies are to be used, then the pressure application process 106 may proceed to apply pressure to the one or more fibers on the section of the fixed inner core using flexible outer dies based on the determined parameters, as at 706. The flexible outer dies may have internal surfaces that expand to apply pressure to the one or more fibers on the section of the fixed inner core. As described herein, the flexible outer dies may be held in storage, brought to the continuous manufacturing system as needed to process the section of the fixed inner core, e.g., using a pallet system, and then returned to storage after completion of processing. Alternatively, the flexible outer dies may remain as part of the continuous manufacturing system and cycle between the pressure application process 106, the curing process 108, and/or the cooling process 110 and/or post-processing.

If it is determined at 704 that fixed outer dies are to be used, then the pressure application process 106 may proceed to select the fixed outer dies based on the section of the core and the determined parameters, as at 708. As described herein, the fixed outer dies may be held in storage, and brought to the continuous manufacturing system as needed to process the section of the inner core, e.g., using a pallet system. After selecting the fixed outer dies at 708, the pressure application process 106 may continue to determine whether the core is a fixed inner core, as at 710. If the core is a fixed inner core, then the pressure application process 106 may continue by applying pressure to the one or more fibers on the section of the fixed inner core using the fixed outer dies based on the determined parameters, as at 712. If it is determined at 710 that the core is not a fixed inner core and instead is a flexible inner core, then the pressure application process 106 may continue by applying pressure to the one or more fibers on the section of the fiber component using the flexible inner core and the fixed outer dies based on the determined parameters, as at 714. As described herein, the flexible inner core may include one or more sections that may expand the fibers woven on the section of the flexible inner core and apply pressure to the fibers against the internal surfaces of the fixed outer dies.

Upon applying pressure to the one or more fibers based on the determined parameters at 706, 712, or 714, the pressure application process 106 may then continue to the curing process 108, as described further with respect to FIG. 8. The pressure application process 106 may continue throughout the curing process 108, and upon completion of the curing process 108, the pressure application process 106 may proceed by removing the pressure applied to the one or more fibers on the section of the core using the flexible inner core and/or the outer dies, as at 716, as shown in FIG. 7B. If a section of the flexible inner core was used to apply pressure, the section of the flexible inner core may be contracted to remove the pressure applied to the fibers. If flexible outer dies were used to apply pressure, the internal surfaces of the flexible outer dies may be contracted to remove the pressure applied to the fibers. If fixed outer dies were used to apply pressure, the fixed outer dies may be removed from the continuous manufacturing process to remove the pressure applied to the fibers.

The pressure application process 106 may then continue by cycling fixed outer dies back to storage, as at 718. Alternatively, if the fixed outer dies are to be used at an upcoming section of the fiber component, the fixed outer dies may be staged or otherwise maintained near the continuous manufacturing system for use with the upcoming section of the fiber component. In addition, flexible outer dies may also be cycled back to storage, as at 718. Alternatively, the flexible outer dies may remain as part of the continuous manufacturing system and cycle between the pressure application process 106, the curing process 108, and/or the cooling process 110 and/or post-processing.

Then, the pressure application process 106 may determine whether all sections of the core or fiber component have completed pressure application, as at 720. If it is determined that there are further sections of the core or fiber component to be pressed, then the process returns to 702 to determine pressure application parameters of the next section of the core or fiber component to be pressed. If it is determined at 720 that all sections of the core or fiber component have been pressed, then the pressure application process 106 may end, as at 722.

FIG. 8 is a flow diagram illustrating an example curing process 108, according to an implementation. The example curing process 108 may relate to the first or second example continuous manufacturing systems 200, 300, in which woven fibers on a section of a core or fiber component are cured.

The curing process 108 may begin by determining parameters for curing one or more fibers on a section of a core, as at 802. The curing parameters may include a curing temperature, a curing duration, a rate of temperature change, or other parameters. In addition, the curing parameters may be determined based at least in part on a core material, any of the weaving parameters, properties or characteristics of the inner and/or outer dies, an ambient temperature, any of the pressure application parameters, other parameters, or combinations thereof. Further, the curing parameters may further take into account a type of resin, whether the fibers are pre-impregnated with resin or require a separate resin application before curing, or other parameters associated with the resin and/or fiber materials or characteristics. The curing process 108 may continue by curing the one or more fibers on the section of the core based on the determined parameters, as at 804. For example, the one or more fibers on the section of the core may pass through a curing oven while having pressure applied by the flexible inner core and/or one or more outer dies. Alternatively or in addition, the flexible inner core and/or the one or more outer dies may apply heat directly to the one or more fibers on the section of the core.

Then, the curing process 108 may determine whether all sections of the core or fiber component have been cured, as at 806. If it is determined that there are further sections of the core or fiber component to be cured, then the process returns to 802 to determine curing parameters of the next section of the core or fiber component to be cured. If it is determined at 806 that all sections of the core or fiber component have been cured, then the curing process 108 may end, as at 808.

FIG. 9 is a flow diagram illustrating an example cooling process 110, according to an implementation. The example cooling process 110 may relate to the first or second example continuous manufacturing systems 200, 300, in which woven and cured fibers on a section of a core or fiber component are cooled.

The cooling process 110 may begin by determining parameters for cooling one or more fibers on a section of a core, as at 902. The cooling parameters may include a cooling temperature, a cooling duration, a rate of temperature change, or other parameters. In addition, the cooling parameters may be determined based at least in part on a core material, any of the weaving parameters, properties or characteristics of the inner and/or outer dies, an ambient temperature, any of the pressure application parameters, any of the curing parameters, other parameters, or combinations thereof. Further, the cooling parameters may further take into account a type of resin, whether the fibers are pre-impregnated with resin or require a separate resin application before curing, or other parameters associated with the resin and/or fiber materials or characteristics. The cooling process 110 may continue by cooling the one or more fibers on the section of the core based on the determined parameters, as at 904. For example, the flexible inner core and/or the one or more outer dies may remove heat and/or pressure applied to the one or more fibers on the section of the core. In addition, the one or more fibers may pass out of the curing oven. Further, as described herein, the cooling process 110 may include additional cooling processes, such as forced air cooling, water cooling, dipping or submerging the woven fibers in a cooling bath, other cooling processes, or combinations thereof.

Then, the cooling process 110 may determine whether all sections of the core or fiber component have been cooled, as at 906. If it is determined that there are further sections of the core or fiber component to be cooled, then the process returns to 902 to determine cooling parameters of the next section of the core or fiber component to be cooled. If it is determined at 906 that all sections of the core or fiber component have been cooled, then the cooling process 110 may end, as at 908.

After the cooling process of FIG. 9, the sections of the core or fiber component may undergo various post-processing. For example, post-processing may include various cutting, drilling, grinding, surface finishing, painting, coating, or other processing. In addition, if a fixed inner core was used, the material of the fixed inner core may be dissolved or otherwise removed, e.g., through the use of particular chemicals or solvents, or other removal methods. Further, if additional fibers having different functions or characteristics have been woven into the fiber components, the fiber components may undergo various electrical connection, power connection, communication connection, or other processing associated with the functions or characteristics of the additional fibers. The post-processing may proceed continuously on the one or more fibers on each of the plurality of sections of the core or fiber component according to desired post-processing parameters.

Figure 10A:
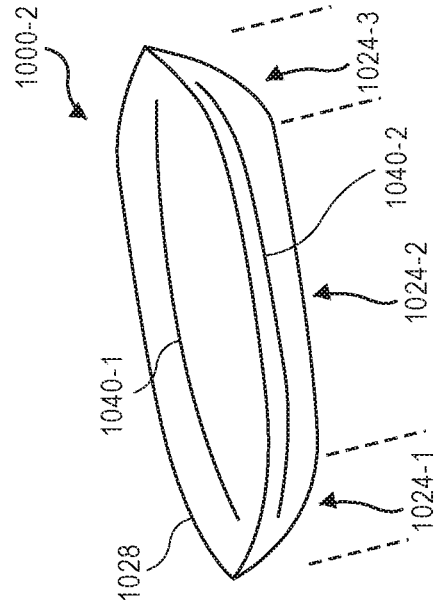
FIGS. 10A-10D are schematic diagrams of example fiber components manufactured using a continuous manufacturing process or system, according to implementations.
Figure 10C:
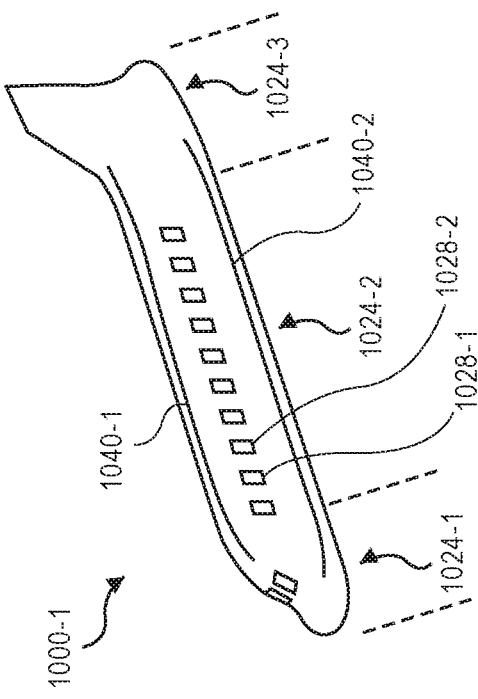
Figure 10B:
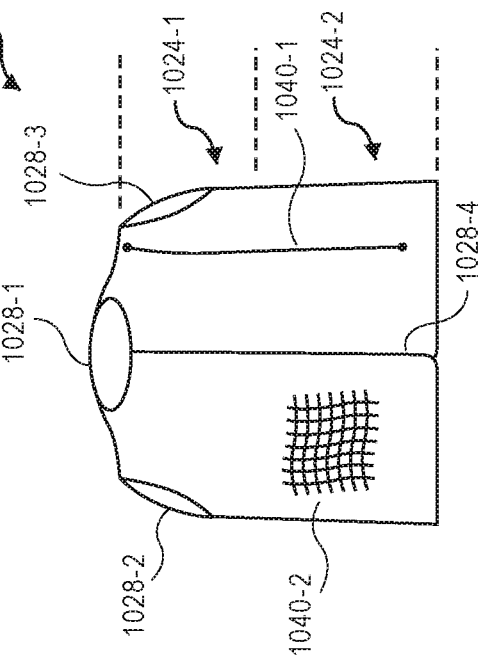
Figure 10D:
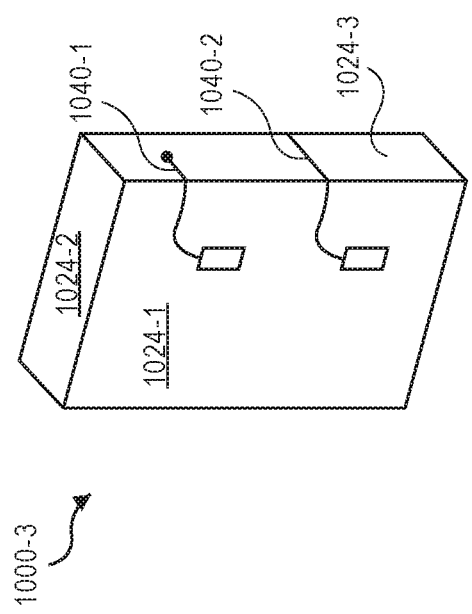

FIGS. 10A-10D are schematic diagrams of example fiber components 1000-1, 1000-2, 1000-3, 1000-4 manufactured using a continuous manufacturing process or system, according to implementations. For example, FIG. 10A shows an example air-based vehicle fuselage 1000-1 that may be continuously manufactured using the processes and systems described herein, FIG. 10B shows an example water-based vehicle hull 1000-2 that may be continuously manufactured using the processes and systems described herein, FIG. 10C shows an example building material 1000-3 that may be continuously manufactured using the processes and systems described herein, and FIG. 10D shows an example clothing article 1000-4 that may be continuously manufactured using the processes and systems described herein.

As shown in FIG. 10A, a fuselage 1000-1 of an air-based vehicle may be an example of a continuously manufactured fiber component using the processes and systems described herein. The fuselage 1000-1 may include various sections 1024-1, 1024-2, 1024-3 having different weaving parameters and/or structural properties or characteristics. In addition, the fuselage 1000-1 may include additional fibers or materials 1040-1, 1040-2 that are woven together with the structural fibers, in which the additional fibers are associated with additional functions or characteristics, such as electrical, power, or communication connections. Further, the fuselage 1000-1 may have undergone various post-processing to create one or more openings 1028-1, 1028-2, in addition to painting, coating, other surface finishing, or assembly or installation processes.

As shown in FIG. 10B, a hull 1000-2 of a water-based vehicle may be an example of a continuously manufactured fiber component using the processes and systems described herein. The hull 1000-2 may include various sections 1024-1, 1024-2, 1024-3 having different weaving parameters and/or structural properties or characteristics. In addition, the hull 1000-2 may include additional fibers or materials 1040-1, 1040-2 that are woven together with the structural fibers, in which the additional fibers are associated with additional functions or characteristics, such as electrical, power, or communication connections. Further, the hull 1000-2 may have undergone various post-processing to create one or more openings 1028, in addition to painting, coating, other surface finishing, or assembly or installation processes.

As shown in FIG. 10C, a building material 1000-3, e.g., a column or wall component, may be an example of a continuously manufactured fiber component using the processes and systems described herein. The building material 1000-3 may include various sections 1024-1, 1024-2, 1024-3 having different weaving parameters and/or structural properties or characteristics. In addition, the building material 1000-3 may include additional fibers or materials 1040-1, 1040-2 that are woven together with the structural fibers, in which the additional fibers are associated with additional functions or characteristics, such as electrical, power, or communication connections. For example, the additional fibers 1040-1, 1040-2 may provide an electrical, power, or communication connections between various sections 1024 of the building material 1000-3 and/or to sections 1024 of other adjacent building materials. Further, the building material 1000-3 may have undergone various post-processing, such as cutting, drilling, painting, coating, other surface finishing, or assembly or installation processes.

As shown in FIG. 10D, a clothing article 1000-4, e.g., a vest or jacket, may be an example of a continuously manufactured fiber component using the processes and systems described herein. The clothing article 1000-4 may include various sections 1024-1, 1024-2 having different weaving parameters and/or structural properties or characteristics. In addition, the clothing article 1000-4 may include additional fibers or materials 1040-1, 1040-2 that are woven together with the structural fibers, in which the additional fibers are associated with additional functions or characteristics, such as electrical, power, or communication connections. For example, the additional fiber 1040-1 may provide an electrical, power, or communication connection between a belt- or waisted-mounted device and a shoulder-mounted device or earpiece. In addition, the additional fiber 1040-2 may be woven using an electromagnetic or radiofrequency interference blocking fiber or materials to protect one or more devices held within a pocket, e.g., an inside pocket, of the clothing article 1000-4. Further, the clothing article 1000-4 may have undergone various post-processing to create one or more openings or seams 1028-1, 1028-2, 1028-3, 1028-4, in addition to printing, sewing, embroidery, painting, coating, other surface finishing, or assembly or installation processes.

While FIGS. 10A-10D show a particular number and configuration of sections 1024, portions 1028 that have undergone post-processing, and additional fibers 1040, any other number or configuration of sections 1024, portions 1028 that have undergone post-processing, and/or additional fibers 1040 may be used in the example continuously manufactured fiber components using the processes and systems described herein.

Figure 11:
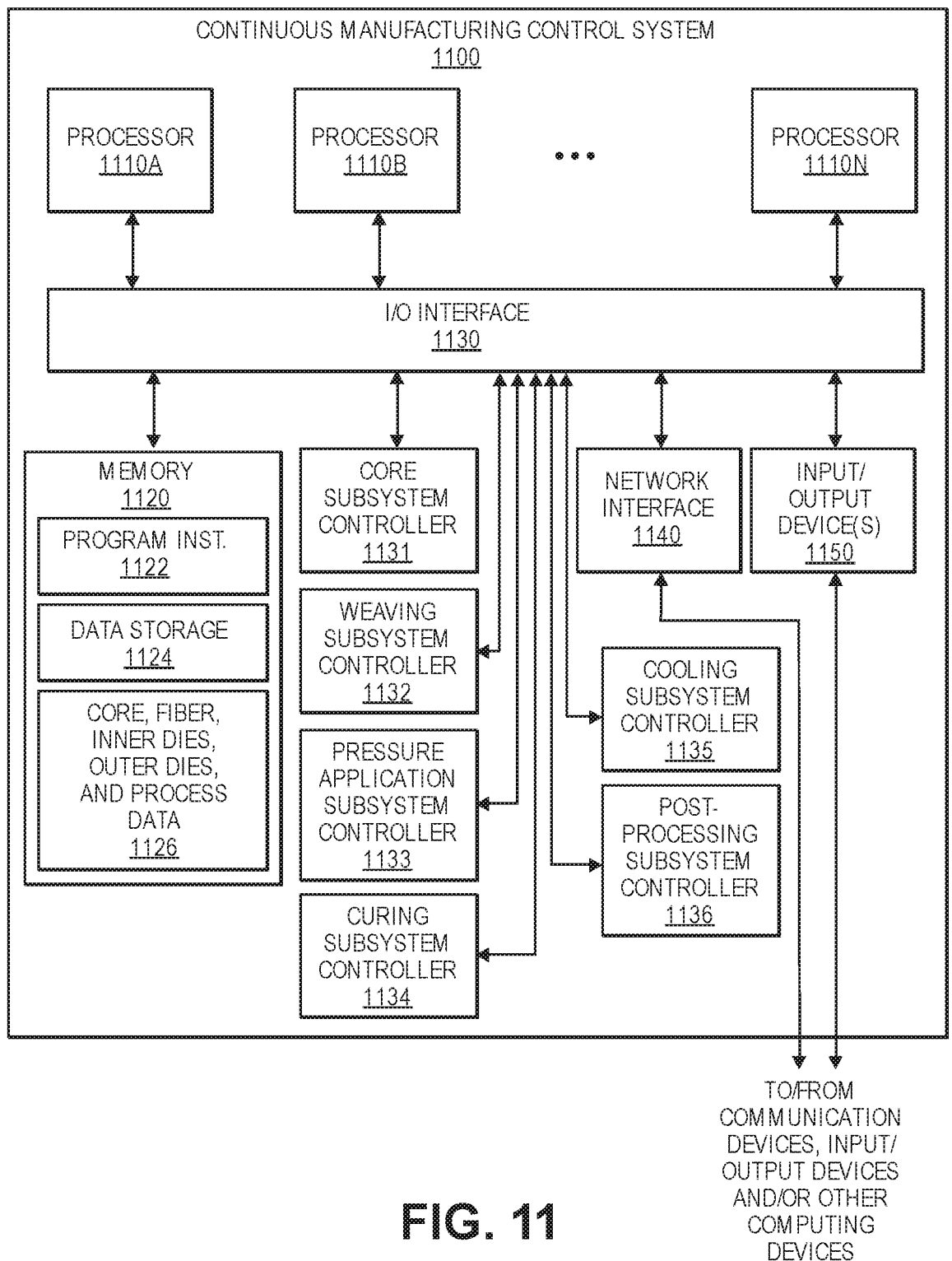
FIG. 11 is a block diagram illustrating various components of a continuous manufacturing control system, according to an implementation.

FIG. 11 is a block diagram illustrating various components of a continuous manufacturing control system 1100, according to an implementation. In various examples, the block diagram may be illustrative of one or more aspects of the continuous manufacturing control system 1100 that may be used to implement the various systems and processes discussed above. In the illustrated implementation, the continuous manufacturing control system 1100 includes one or more processors 1110, coupled to a non-transitory computer readable storage medium 1120 via an input/output (I/O) interface 1130. The continuous manufacturing control system 1100 may also include a core subsystem controller 1131, a weaving subsystem controller 1132, a pressure application subsystem controller 1133, a curing subsystem controller 1134, a cooling subsystem controller 1135, and/or a post-processing subsystem controller 1136. The continuous manufacturing control system 1100 further includes a network interface 1140, and one or more input/output devices 1150.

In various implementations, the continuous manufacturing control system 1100 may be a uniprocessor system including one processor 1110, or a multiprocessor system including several processors 1110A, 1110B, . . . 1110N (e.g., two, four, eight, or another suitable number). The processor(s) 1110 may be any suitable processor capable of executing instructions. For example, in various implementations, the processor(s) 1110 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1110 may commonly, but not necessarily, implement the same ISA.

The non-transitory computer readable storage medium 1120 may be configured to store program instructions, core, fiber, inner dies, outer dies, and process data and parameters, and/or other data items accessible by the processor(s) 1110. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and core, fiber, inner dies, outer dies, and process data and parameters 1126, respectively. In other implementations, program instructions, data and/or core, fiber, inner dies, outer dies, and process data and parameters may be received, sent or stored upon different types of computer-accessible media, such as non-transitory media, or on similar media separate from the non-transitory computer readable storage medium 1120 or the continuous manufacturing control system 1100. Core, fiber, inner dies, outer dies, and process data and parameters may include any and all of the data, dimensions, parameters, properties, characteristics, and other data described herein with respect to the continuous manufacturing systems and processes, including all subsystems and subprocesses.

Generally speaking, a non-transitory, computer readable storage medium may include storage media or memory media such as magnetic or optical media, e.g., disk or CD/DVD-ROM, coupled to the continuous manufacturing control system 1100 via the I/O interface 1130. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1140.

In one implementation, the I/O interface 1130 may be configured to coordinate I/O traffic between the processor(s) 1110, the non-transitory computer readable storage medium 1120, and any peripheral devices, the network interface 1140 or other peripheral interfaces, such as input/output devices 1150. In some implementations, the I/O interface 1130 may perform any necessary protocol, timing or other data transformations to convert data signals from one component (e.g., non-transitory computer readable storage medium 1120) into a format suitable for use by another component (e.g., processor(s) 1110). In some implementations, the I/O interface 1130 may include support for devices attached through various types of peripheral buses, such as a variant of the Peripheral Component Interconnect (PCI) bus standard or the Universal Serial Bus (USB) standard, for example. In some implementations, the function of the I/O interface 1130 may be split into two or more separate components, such as a north bridge and a south bridge, for example. Also, in some implementations, some or all of the functionality of the I/O interface 1130, such as an interface to the non-transitory computer readable storage medium 1120, may be incorporated directly into the processor(s) 1110.

The core subsystem controller 1131 may implement the core preparation process 102 described herein with respect to FIGS. 1 and 5, by controlling the core preparation subsystem 202 and the core subsystem 302 and corresponding components described herein with respect to FIGS. 2-4.

The weaving subsystem controller 1132 may implement the weaving process 104 described herein with respect to FIGS. 1 and 6, by controlling the weaving subsystem 204, 304 and corresponding components described herein with respect to FIGS. 2 and 3.

The pressure application subsystem controller 1133 may implement the pressure application process 106 described herein with respect to FIGS. 1, 7A, and 7B, by controlling the pressure application subsystems and corresponding components described herein with respect to FIGS. 2 and 3.

The curing subsystem controller 1134 may implement the curing process 108 described herein with respect to FIGS. 1 and 8, by controlling the curing subsystems and corresponding components described herein with respect to FIGS. 2 and 3.

The cooling subsystem controller 1135 may implement the cooling process 110 described herein with respect to FIGS. 1 and 9, by controlling the cooling subsystems and corresponding components described herein with respect to FIGS. 2 and 3.

The post-processing subsystem controller 1136 may implement the post-processing 112 described herein with respect to FIG. 1, by controlling the post-processing subsystems and corresponding components described herein with respect to FIGS. 2 and 3.

The network interface 1140 may be configured to allow data to be exchanged between continuous manufacturing control system 1100, other devices attached to a network, such as other computer systems, and/or other continuous manufacturing control systems. For example, the network interface 1140 may enable wireless communication between numerous manufacturing control systems. In various implementations, the network interface 1140 may support communication via wireless general data networks, such as a Wi-Fi network. For example, the network interface 1140 may support communication via telecommunications networks such as cellular communication networks, satellite networks, and the like.

Input/output devices 1150 may, in some implementations, include one or more displays, image capture devices, scanning devices, thermal sensors, infrared sensors, time of flight sensors, accelerometers, pressure sensors, contact sensors, environment sensors, etc. Multiple input/output devices 1150 may be present and controlled by the continuous manufacturing control system 1100. One or more of these sensors may be utilized to assist in the continuous manufacturing process as well as various particular operations of the subprocesses.

As shown in FIG. 11, the memory may include program instructions 1122 which may be configured to implement the example processes and/or sub-processes described above. The data storage 1124 may include various data stores for maintaining data items that may be provided for continuous manufacturing of fiber components. The core, fiber, inner dies, outer dies, and process data and parameters may include any and all of the data, dimensions, parameters, properties, characteristics, and other data described herein with respect to the continuous manufacturing systems and processes, including all subsystems and subprocesses.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the continuous manufacturing control system 1100 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The continuous manufacturing control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated continuous manufacturing control system 1100. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the continuous manufacturing control system 1100 may be transmitted to the continuous manufacturing control system 1100 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other continuous manufacturing control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method, comprising:
    weaving a fiber around a plurality of sections of an inner core from a first end to a second end of the inner core;
    applying, using at least one of the inner core or a plurality of outer dies, pressure to the fiber around each of the plurality of sections in sequence from the first end to the second end; and
    curing the fiber around each of the plurality of sections in sequence from the first end to the second end;
    wherein each of the plurality of outer dies is formed to correspond to a respective section of the plurality of sections of the inner core.

2. The method of claim 1, further comprising:
    removing the pressure applied by the at least one of the inner core or the plurality of outer dies from the fiber around each of the plurality of sections in sequence from the first end to the second end; and
    cooling the fiber around each of the plurality of sections in sequence from the first end to the second end.

3. The method of claim 1, further comprising:
    selecting weaving parameters for the fiber around the plurality of sections, wherein the selected weaving parameters for at least two of the plurality of sections are different, and wherein the weaving parameters include at least one of weaving angle, weaving direction, weaving density or spacing, fiber type, fiber size, or a number of fiber layers.

4. The method of claim 1, wherein the inner core comprises a fixed inner core, and further comprising:
    forming the fixed inner core to a desired shape, the fixed inner core including the plurality of sections from the first end to the second end.

5. The method of claim 4, wherein each of the plurality of outer dies applies the pressure to the fiber around each of the plurality of sections of the fixed inner core in sequence from the first end to the second end.

6. The method of claim 5, wherein each of the plurality of outer dies comprises at least one of a fixed outer die or an expandable outer die.

7. The method of claim 1, wherein the inner core comprises an expandable inner die.

8. The method of claim 7, wherein the expandable inner die applies the pressure to the fiber around each of the plurality of sections of the expandable inner die in sequence from the first end to the second end.

9. The method of claim 8, wherein each of the plurality of outer dies comprises a fixed outer die.

10. The method of claim 1, further comprising:
    selecting a second fiber to be woven around at least one section of the inner core, wherein the second fiber is at least one of a conductor, an insulator, a wire, an antenna, a tube, a pipe, a channel, an electromagnetic or radiofrequency signal transmitting fiber, or an electromagnetic or radiofrequency interference blocking fiber.

11. A method of continuously manufacturing fiber components, comprising:
    forming an inner core to a desired shape, the inner core including a plurality of sections from a first end to a second end;
    weaving carbon fiber around the plurality of sections of the inner core in sequence from the first end to the second end;
    applying, using at least one of the inner core or a plurality of outer dies, pressure to the carbon fiber around each of the plurality of sections in sequence from the first end to the second end;
    curing the carbon fiber around each of the plurality of sections in sequence from the first end to the second end;
    removing the pressure applied by the at least one of the inner core or the plurality of outer dies from the carbon fiber around each of the plurality of sections in sequence from the first end to the second end; and cooling the carbon fiber around each of the plurality of sections in sequence from the first end to the second end;

wherein each of the plurality of outer dies is formed to correspond to a respective section of the plurality of sections of the inner core.

12. The method of claim 11, further comprising:

selecting weaving parameters for the carbon fiber around the plurality of sections, wherein the selected weaving parameters for at least two of the plurality of sections are different.

13. The method of claim 12, wherein the weaving parameters include at least one of weaving angle, weaving direction, weaving density or spacing, fiber type, fiber size, or a number of fiber layers.

14. The method of claim 12, wherein the weaving parameters are selected to control respective properties of each of the plurality of sections, wherein the properties include at least one of strength, stiffness, flexibility, or weight.

* * * * *